(12) United States Patent
Sasongko et al.

(10) Patent No.: US 11,601,077 B1
(45) Date of Patent: Mar. 7, 2023

(54) TECHNOLOGIES FOR REDUNDANT SHAFT INFORMATION FEEDBACK IN ELECTRIC MACHINE SYSTEMS INCLUDING A RESOLVER

(71) Applicant: Rolls-Royce Corporation, Indianapolis, IN (US)

(72) Inventors: Firman Sasongko, Singapore (SE); Md Shafquat Ullah Khan, Singapore (SE); Rejeki Simanjorang, Singapore (SE)

(73) Assignee: Rolls-Royce Corporation, Indianapolis, IN (US)

(*) Notice: Subject to any disclaimer, the term of this patent is extended or adjusted under 35 U.S.C. 154(b) by 0 days.

(21) Appl. No.: 17/491,464

(22) Filed: Sep. 30, 2021

(51) Int. Cl.
*H02P 27/06* (2006.01)
*H02P 5/74* (2006.01)
*H02M 1/00* (2006.01)

(52) U.S. Cl.
CPC .............. *H02P 5/74* (2013.01); *H02M 1/008* (2021.05); *H02P 27/06* (2013.01)

(58) Field of Classification Search
CPC ............ H02P 27/06; H02P 5/74; H02M 1/008
See application file for complete search history.

(56) References Cited

U.S. PATENT DOCUMENTS

| | | |
|---|---|---|
| 5,708,344 A | 1/1998 | Hayashi et al. |
| 5,760,562 A | 6/1998 | Woodland et al. |
| 6,472,841 B1 | 10/2002 | Piedl et al. |
| 6,930,423 B2 | 8/2005 | Kitazawa |
| 6,998,747 B2 | 2/2006 | Kujirai et al. |
| 7,005,771 B2 | 2/2006 | Kobayashi |
| 7,088,025 B2 | 8/2006 | Kujirai et al. |
| 7,157,906 B2 | 1/2007 | Miya |
| 7,343,254 B2 | 3/2008 | Otsuka et al. |
| 8,089,233 B2 | 1/2012 | Kanekawa et al. |
| 9,013,132 B2 | 4/2015 | Nakazato |
| 10,184,806 B2 | 1/2019 | Komatsu |
| 2011/0074323 A1* | 3/2011 | Mukai .................... H02P 29/032 318/400.21 |

(Continued)

FOREIGN PATENT DOCUMENTS

| | | |
|---|---|---|
| EP | 1473548 A1 | 11/2004 |
| FR | 3078566 A1 | 9/2019 |

(Continued)

*Primary Examiner* — Rina I Duda
(74) *Attorney, Agent, or Firm* — Barnes & Thornburg LLP

(57) ABSTRACT

Electric machine drive systems, and related electric machine embodiments, include technologies for providing redundancy of shaft information of one or more electric machines between converter controllers of the corresponding system. The converter controllers are configured to control operation of power converters, which control one or more electric machines. The disclosed technologies include establishing one or more communication buses between the converter controllers to share the shaft information, which may be based on analog signals from a single, common resolver and/or from different, redundant resolvers depending on the embodiment. For example, in some embodiments, converter controllers communicatively connected to the same resolver may include separate resolver-to-digital converters (RDCs) to provide redundancy of the RDCs.

20 Claims, 14 Drawing Sheets

(56) References Cited

U.S. PATENT DOCUMENTS

| | | | |
|---|---|---|---|
| 2016/0200355 A1* | 7/2016 | Mori | H02P 21/22 |
| | | | 180/446 |
| 2017/0291635 A1* | 10/2017 | Yamasaki | H02M 7/003 |
| 2020/0266748 A1* | 8/2020 | Seki | H02P 21/22 |

FOREIGN PATENT DOCUMENTS

| | | | |
|---|---|---|---|
| JP | 2006250864 A | 9/2006 | |
| JP | 4496110 B2 | 7/2010 | |
| JP | 5396592 B2 | 1/2014 | |

* cited by examiner

US 11,601,077 B1

TECHNOLOGIES FOR REDUNDANT SHAFT INFORMATION FEEDBACK IN ELECTRIC MACHINE SYSTEMS INCLUDING A RESOLVER

CROSS-REFERENCE TO RELATED APPLICATIONS

Cross-reference is made to U.S. Utility patent application Ser. No. 17/491,448, entitled "Technologies for Redundant Shaft Information Feedback in Multi-Machine Systems with Multiple Resolvers", which was filed on Sep. 30, 2021 by Firman Sasongko et al. and to U.S. Utility patent application Ser. No. 17/491,467, entitled "Technologies for Redundant Shaft Information Feedback in Electric Machine systems Having Multiple Resolvers", which was filed on Sep. 20, 2021 by Firman Sasongko et al.

FIELD OF THE DISCLOSURE

The present disclosure relates generally to technologies for controlling power converters, and more specifically to technologies for providing redundant shaft information to controllers of power converters.

BACKGROUND

Many high-power electric drive applications, such as electric vehicles (EVs), utilize multi-phase machine and/or multi-machine electric drive systems to provide higher power and torque. For example, in some EV applications, multiple electric machines may be coupled to a common shaft to increase overall power and torque in the vehicle and provide an amount of fault tolerance. Similarly, a single electric machine may have multiple sets of windings (e.g., three phase or five phase windings) to provide increased power output of the electric machine. Additionally, the inclusion of multiple electric machines and/or multiple sets of windings may provide some level of fault tolerance.

In such multi-phase/multi-machine systems, each set of windings of each electric machine (e.g., each motor) is connected to a separate power converter configured to control the energization of the corresponding set of windings based on input control signals (e.g., gates signals). In this way, the power converters control operation of the connected electric machine. Each power converter is in turn connected to a separate, typically independent, converter controller, which controls operation of the corresponding power converter. To do so, each power converter requires shaft information indicative of the present angle and speed of the motor shaft of the corresponding electric machine. The shaft information may be obtained from a resolver or an encoder coupled to the motor shaft of the corresponding electric machine.

In applications requiring high reliability and durability, resolvers may be preferred over encoders for determining the shaft information. However, resolvers require an alternating current (AC) excitation signal and analog output signal processing circuit to determine the shaft angle and speed. As such, each converter controller is connected to a separate resolver and includes a resolver-to-digital converter (RDC) circuit to control operation of the resolver and convert the analog output signals received from the controlled resolver to generate digital output signals indicative of the angle and speed of the motor shaft to which the corresponding resolver is coupled. Although a single resolver may include some amount of internal redundancy (e.g., two excitation windings and two sets of output windings), any failure of the resolver, the corresponding RDC, and/or the associated converter controller can render the whole electric drive system inoperable. As such, in critical applications, one or more duplicative resolver-RDC-converter controller combinations may be used to provide redundancy to the system should the primary resolver-RDC-converter controller experience a failure, which can significantly increase the overall cost of the system.

SUMMARY

The present disclosure may comprise one or more of the following features and combinations thereof.

According to an aspect of the disclosure, a system for controlling operation of a plurality of power converters may include a first resolver, a second resolver, a first power converter, a second power converter, a first converter controller, and a second converter controller. The first and second resolvers may be coupled to a shaft of a multi-machine drive system, and the multi-machine drive system may include a first electric machine and a second electric machine coupled to the shaft. The first power converter may be electrically coupled to a first set of windings of the first electric machine. Similarly, the second power converter electrically may be coupled to a first set of windings of the second electric machine.

The first converter controller may be communicatively coupled to the first power converter and may include a first resolver-to-digital converter (RDC) communicatively coupled to the first resolver to receive analog output signals from the first resolver and a communication circuit communicatively coupled to a first communication bus. The first converter controller may be configured to activate the first RDC to convert the analog output signals received from the first resolver to first digital output signals indicative of an angle and a speed of the shaft and control, in response to activation of the first RDC, operation of the first power converter based on the first digital output signals. The second converter controller communicatively may be coupled to the second power converter and include a second RDC communicatively coupled to the second resolver to receive analog output signals from the second resolver and a communication circuit communicatively coupled to the first communication bus. The second converter controller may also be configured to activate the second RDC to convert the analog output signals received from the second resolver to second digital output signals indicative of an angle and a speed of the shaft and control, in response to activation of the second RDC, operation of the second power converter based on the second digital output signals. Additionally, in response to activation of the first RDC, the first converter controller may be further configured to transmit the first digital output signals to the second converter controller over the first communication bus.

In some embodiments, the communication circuit of the first converter controller may be further communicatively coupled to the communication circuit of the second converter controller via a second communication bus. In such embodiments, the second converter controller may be configured to transmit the second digital output signals to the first converter controller over the second communication bus. Additionally, in such embodiments, the communication circuit of the first converter controller may include a transceiver communicatively coupled to the first communication bus and a separate receiver communicatively coupled to the second communication bus. The communication circuit of the second converter controller may include a transceiver communicatively coupled to the second communication bus and a separate receiver communicatively coupled to the first communication bus. Additionally or alternatively, the first converter controller may be further configured to determine a control strategy based on the first digital output signals and the second digital output signals. In such embodiments, the first converter controller may be configured to control operation of the first power converter based on the control strategy. In some embodiments, to determine the control strategy may include to select one of the first digital output signals or the second digital output signals.

Additionally, in some embodiments, the system may further include a third power converter and a third converter controller. The third power converter may be electrically coupled a second set of windings of the first electric machine, and the third converter controller may be communicatively coupled to the third power converter and have a third RDC communicatively coupled to the first resolver to receive the analog output signals from the first resolver and a communication circuit communicatively coupled to the first communication bus to receive the first digital output signals from the first converter controller. In such embodiments, in response to activation of the first RDC, the third converter controller may be configured to control operation of the third power converter based on the first digital output signals. Additionally, the communication circuit of the third converter controller may be further communicatively coupled to the communication circuit of the second converter controller via the second communication bus, and the second converter controller may be configured to transmit the second digital output signals to the third converter controller over the second communication bus. In some embodiments, the communication circuit of the third converter controller may include a transceiver communicatively coupled to the first communication bus and a separate receiver communicatively coupled to the second communication bus.

In some embodiments, the first converter controller may also be configured to determine whether a priority of the first converter controller is greater than a priority of the third converter controller. In such embodiments, to activate the first RDC may include to activate the first RDC in response to a determination that the priority of the first converter controller is greater than the priority of the third converter controller. Additionally, in such embodiments, the first converter controller may be further configured to detect an error in operation of the first RDC and, in response to detection of the error, deactivate the first RDC and transmit a notification that the first RDC has been deactivated to the second converter controller and the third converter controller via the first communication bus. Additionally, the third converter controller, in response to receipt of the notification, may be configured to activate the third RDC to convert the analog output signals received from the first resolver to third digital output signals indicative of an angle and a speed of the shaft and control, in response to activation of the third RDC, operation of the third power converter based on the third digital output signals. In some embodiments, the third converter controller, in response to receipt of the notification, may be further configured to transmit the third digital output signals to the first converter controller and the second converter controller via the first communication bus.

According to another aspect of the disclosure, a method for controlling operation of a plurality of power converters may include receiving, by a first resolver-to-digital converter (RDC) of a first converter controller, analog output signals from a first resolver coupled to a shaft of a multi-machine drive system. The multi-machine drive system may include a first electric machine and a second electric machine coupled to the shaft. The method may also include converting, by the first RDC, the analog output signals received from the first resolver to first digital output signals indicative of an angle and a speed of the shaft; controlling, by the first converter controller and based on the first digital output signals, operation of a first power converter coupled to a first set of windings of a first electric machine of the multi-machine drive system; receiving, by a second RDC of a second converter controller, analog output signals from a second resolver coupled the shaft; converting, by the second RDC, the analog output signals received from the second resolver to second digital output signals indicative of an angle and a speed of the shaft; controlling, by the second converter controller and based on the second digital output signals, operation of a second power converter coupled to a first set of windings of a second electric machine of the multi-machine drive system; and transmitting, by a communication circuit of the first converter controller and to a communication circuit of the second converter controller, the first digital output signals over a first communication bus.

In some embodiments, the method may also include transmitting, by the communication circuit of the second converter controller to the communication circuit of the first converter controller, the second digital output signals over a second communication bus. Additionally or alternatively, the method may include receiving, by a communication circuit of a third power converter and from the first power converter, the first digital output signals over the first communication bus; and controlling, by the third converter controller and based on the first digital output signals, operation of a third power converter coupled to a second set of windings of a first electric machine of the multi-machine drive system. In some embodiments, the method may further include detecting, by the first converter controller, an error in operation of the first RDC; deactivating, by the first converter controller and in response to detection of the error, the first RDC; transmitting a notification that the first RDC has been deactivated to the third converter controller over the first communication bus; activating, by the third converter controller, a third RDC of the third converter controller in response to receipt of the notification by the third converter controller, wherein the third RDC is coupled to the first resolver; receiving, by the third RDC, the analog output signals from the first resolver; converting, by the third RDC, the analog output signals received from the first resolver to third digital output signals indicative of an angle and a speed of the shaft; and transmitting, by the communication circuit of the third converter controller and to the communication circuit of the first converter controller, the third digital output signals over the first communication bus.

According to yet another aspect, a method for controlling operation of a power converter may include receiving, by a first converter controller, first digital output signals from a second converter controller via a first communication bus. The first digital output signals may be indicative of an angle and a speed of a shaft of a multi-machine drive system, and each of the first converter controller and the second converter controller may include a resolver-to-digital converter (RDC) coupled to a first resolver coupled to the shaft. The method may also include receiving, by the first converter controller, second digital output signals from a third converter controller via a second communication bus different from the first communication bus. The second digital output signals may be indicative of an angle and a speed of the shaft and are produced by an RDC of the third converter controller coupled to a second resolver coupled to the shaft. The method may further include controlling, by the first converter controller and based on the first digital output signals or the second digital output signals, a power converter coupled to a set of windings of an electric machine of the multi-machine drive system.

In some embodiments, controlling the power converter may include determining a control strategy based on the first digital output signals and the second digital output signals and controlling the power converter based on the determined control strategy. Additionally, in some embodiments, determining the control strategy may further include determining, by the first converter controller, whether the first digital output signals are valid and determining, by the first converter controller, to control the power converter based only on the second digital output signals in response to a determination that the first digital output signals are not valid.

In some embodiments, the method may further include receiving, by the first converter controller, a notification that indicates that the RDC of the second converter controller is inactive; determining, by the first converter controller and in response to receiving the notification, whether the first converter controller has priority relative to other converter controllers, other than the second converter controller, coupled to the first resolver; and in response to a determination that the first converter controller has priority, activating the RDC of the first converter controller, receiving by the RDC of the first converter controller analog output signals from the first resolver, converting, by the RDC of the first converter controller, the analog output signals to third digital output signals, and controlling, by the first converter controller, operation of the power converter coupled to the set of windings of the electric machine of the multi-machine drive system. Additionally, in some embodiments, the method may include transmitting, by the first converter controller and via the first communication bus, a notification to other converter controllers coupled to the first resolver that the first converter controller has activated the RDC of the first converter controller and the third output signals.

According to yet a further aspect of the disclosure, a system for controlling operation of a plurality of power converters may include a resolver, a first power converter, a second power converter, a third power converter, a first converter controller, a second converter controller, a third converter controller, and a communication bus. The resolver may be coupled to a shaft of a multi-phase electric machine of a motor drive system. The first power converter may be electrically coupled to a first set of windings of the multi-phase electric machine, the second power converter may be electrically coupled to a second set of windings of the multi-phase electric machine, and the third power converter may be electrically coupled to a third set of windings of the multi-phase electric machine. The first converter controller may be communicatively coupled to the first power converter and may include a first resolver-to-digital converter (RDC) communicatively coupled to the resolver to receive analog output signals from the resolver and a communication circuit. The first RDC, while activated, may be configured to convert the analog output signals to first digital output signals indicative of an angle and a speed of the shaft. The second converter controller may be communicatively coupled to the second power converter and may include a second RDC communicatively coupled to the resolver to receive the analog output signals from the resolver and a communication circuit. The second RDC may be configured to convert, while activated, the analog output signals to second digital output signals indicative of an angle and a speed of the shaft. The third converter controller may be communicatively coupled to the third power converter and may include a communication circuit. Additionally, each on circuit of each of the first, second, and third converter controllers is coupled to the communication bus.

In some embodiments, the third converter controller may be configured to receive, via the communication bus, the first digital output signals from the first converter controller while the first RDC is activated and the second digital output signals from the second converter controller while the second RDC is activated and control operation of the third power converter based on the received first or second digital output signals. Additionally, in some embodiments, the communication circuit of the first converter controller includes a first transceiver communicatively coupled to the communication bus, the second converter controller includes a second transceiver communicatively coupled to the communication bus, and the third converter controller includes a receiver coupled to the communication bus.

Additionally, in some embodiments, the first converter controller may be configured to determine whether a priority of the first converter controller is greater than a priority of the second converter controller, activate the first RDC in response to a determination that the priority of the first converter controller is greater than the priority of the second converter controller, and transmit, in response to activation of the first RDC, the first digital output signals to the second converter controller and the third converter controller over the communication bus. In such embodiments, the communication circuit of the first converter controller may include a transceiver communicatively coupled to the communication bus, and to transmit the first digital may include to set the transceiver to transmit. Additionally, in such embodiments, the communication circuit of the second converter controller may include a transceiver communicatively coupled to the communication bus and set to receive. The first converter controller may be further configured to transmit, in response to activation of the first RDC and prior to transmission of the first digital output signals, a notification to the second converter controller and the third converter controller over the communication bus. The notification may indicate that the first RDC has been activated.

In some embodiments, to determine whether a priority of the first converter controller is greater than a priority of the second converter controller may include to look up the priority of the first converter controller and the second converter controller in a look-up table stored by the first converter controller. Additionally, in some embodiments, to determine whether a priority of the first converter controller is greater than a priority of the second converter controller may include to broadcast the priority of the first converter controller over the communication bus, receive the priority of the second converter controller over the communication bus and from the second converter controller, and compare the priority of the first converter controller to the priority of the second converter. Further, in some embodiments, the first converter controller may be further configured to transmit, in response to activation of the first RDC and prior to transmission of the first digital output signals, a notification to the second converter controller and the third converter controller over the communication bus. The notification may indicate that the first RDC has been activated.

In some embodiments, the third converter controller may be configured to receive a notification from the first converter controller that the first RDC has been activated, receive the first digital output signals subsequently to receipt of the notification, and control operation of the third power converter based on the received first digital output signals. In such embodiments, the third converter controller may be configured to halt operation of the third power converter in response to receiving a subsequent notification from the first converter controller that the first RDC has been deactivated.

According to another aspect of the present disclosure, a method for controlling operation of a power converter may include determining, by a first converter controller, whether a notification from a second converter controller has been received over a communication bus coupled to the first converter controller and the second converter controller. The notification may indicate that a resolver-to-digital converter (RDC) of the second converter controller has been activated and the RDC of the second converter controller may be communicatively coupled to a resolver coupled to a shaft of a multi-phase electric machine of a motor drive system. The method may also include receiving, by the first converter controller over the communication bus and subsequent to receiving the notification, digital output signals from the second converter controller. The digital output signals are indicative of an angle and a speed of the shaft. Additionally, the method may include controlling, by the first converter controller and in response to receiving the digital output signals, a power converter coupled to a set of windings of the multi-phase electric machine based on the received digital output signals.

In some embodiments, receiving the digital output signals may include receiving, by a receiver of the first converter controller coupled to the communication bus, digital output signals transmitted by a transceiver of the second converter controller coupled to the communication bus. Additionally, in some embodiments, the method may include receiving, by the first converter controller over the communication bus and from the second converter controller, a notification that the RDC of the second converter controller has been deactivated; and halting, by the first converter controller, operation of the power converter in response to receiving the notification that the RDC of the second converter controller has been deactivated. In some embodiments, the method may further include determining, by the first converter controller and subsequent to halting operation of the power converter, whether another notification from a third converter controller has been received over the communication bus. The another notification may indicate that an RDC of the third converter controller has been activated and wherein the RDC of the third converter controller is communicatively coupled to the resolver. In such embodiments, the method may also include receiving, by the first converter controller over the communication bus and subsequent to receiving the another notification, digital output signals from the third converter controller. The digital output signals from the third converter controller may be indicative of an angle and a speed of the shaft. The method may additionally include controlling, by the first converter controller and in response to receiving the digital output signals from the third converter controller, the power converter based on the digital output signals received from the third converter controller.

According to yet a further aspect of the present disclosure, a method for controlling operation of a plurality of power converters may include receiving, by a first resolver-to-digital converter (RDC) of a first converter controller, analog output signals from a resolver coupled to a shaft of a multi-phase electric machine; converting, by the first RDC, the analog output signals to first digital output signals indicative of an angle and a speed of the shaft; controlling, by the first converter controller and based on the first digital output signals, operation of a first power converter coupled to a first set of windings of the multi-phase electric machine; and transmitting, by a transceiver of a communication circuit of the first converter controller and over a communication bus, the first digital output signals to a second converter controller and a third converter controller. The transceiver of the communication circuit of the first converter controller may be set to transmit. The method may also include receiving, by a transceiver of a communication circuit of the second converter controller communicatively coupled to the communication bus, the first digital output signals. The transceiver of the communication circuit of the second converter controller is set to receive. The method may additionally include controlling, by the second converter controller and based on the first digital output signals, operation of a second power converter coupled to a second set of windings of the multi-phase electric machine; receiving, by a receiver of a communication circuit of the third converter controller communicatively coupled to the communication bus, the first digital output signals; and controlling, by the third converter controller and based on the first digital output signals, operation of a third power converter coupled to a third set of windings of the multi-phase electric machine.

In some embodiments, the method may also include activating, by the first converter controller and prior to receiving the analog output signals, the first RDC; and transmitting, by the transceiver of the first converter controller and over the communication bus, an activation notification to the second converter controller and the third converter controller. The activation notification may indicate that the first RDC has been activated. Additionally, in some embodiments, the method may include determining, by the first converter controller, whether a priority of the first converter controller is greater than a priority of the second converter. In such embodiments, activating the first RDC may include activating the first RDC in response to a determination that the priority of the first converter controller is greater than the priority of the second converter.

The method may also include receiving, by the receiver of the third converter controller over the communication bus, the activation notification from the first converter controller. In such embodiments, controlling operation of the third power converter may include controlling, by the third converter controller and in response to receiving the activation notification, the operation of the third power converter based on the first digital output signals. Additionally, in such embodiments, the method may also include detecting, by the first converter controller, an error in operation of the first RDC; deactivating, by the first converter controller and in response to detecting the error, the first RDC; transmitting, by the transceiver of the first converter controller, a deactivation notification to the second converter controller and the third converter controller over the communication bus; setting, by the first converter controller and subsequent to transmitting the deactivation notification, the transceiver of the first converter controller to receive; and halting, by the third converter controller and in response to receiving the deactivation notification, operation of the third power converter.

Additionally, in some embodiments, the method may further include activating, by the second converter controller and in response to receiving the deactivation notification, a second RDC of the second converter controller; setting, by the second converter controller and in response to activating the second RDC, the transceiver of the second converter controller to transmit; and transmitting, by the transceiver of the second converter controller and in response to activating the second RDC, another activation notification to the first converter controller and the third converter controller. The another activation notification may be indicative that the second RDC has been activated. In such embodiments, the method may additionally include receiving, by the second RDC and in response to activating the second RDC, analog output signals from the resolver coupled to the shaft of the multi-phase electric machine; converting, by the second RDC, the analog output signals to second digital output signals indicative of an angle and a speed of the shaft; controlling, by the second converter controller and based on the second digital output signals, operation of the second power converter; transmitting, by the transceiver of the second converter controller and over the communication bus, the second digital output signals to the first converter controller and the third converter controller; receiving, by the transceiver of the first converter controller, the second digital output signals; controlling, by the first converter controller and based on the second digital output signals, operation of the second power converter; receiving, by the receiver of the third converter controller, the second digital output signals; and controlling, by the third converter controller and based on the second digital output signals, operation of the third power converter.

According to a further aspect of the disclosure, a system for controlling operation of a plurality of power converters may include a first resolver coupled to a shaft of a multi-phase motor-generator; a second resolver coupled to the shaft; a first power converter electrically coupled to a first set of windings of the multi-phase motor-generator; a second power converter electrically coupled to a second set of windings of the multi-phase motor-generator; and a third power converter electrically coupled to a third set of windings of the multi-phase motor-generator. The system also includes a first converter controller communicatively coupled to the first power converter and configured to control operation of the first power converter, a second converter controller communicatively coupled to the second power converter and configured to control operation of the second power converter, and a third converter controller communicatively coupled to the third power converter and configured to control operation of the third power converter. The first converter controller may include a first resolver-to-digital converter (RDC) communicatively coupled to the first resolver and a communication circuit having a transceiver communicatively coupled to a first communication bus and a receiver communicatively coupled to a second communication bus. The second converter controller may include a second RDC communicatively coupled to the first resolver and a communication circuit having a transceiver communicatively coupled to the first communication bus and a receiver communicatively coupled to the second communication bus. The third converter controller may include a third RDC communicatively coupled to the second resolver and a communication circuit having a transceiver communicatively coupled to the second communication bus and a receiver communicatively coupled to the first communication bus.

In some embodiments, the first converter controller may be configured to activate the first RDC to receive analog output signals from the first resolver and convert the analog output signals received from the first resolver to first digital output signals indicative of an angle and a speed of the shaft, control, in response to activation of the first RDC, operation of the first power converter based on the first digital output signals, and transmit the first digital output signals to the second converter controller and the third converter controller over the first communication bus. In such embodiments, the second converter controller may be configured to receive the first digital output signals from the first converter controller over the first communication bus and control operation of the second converter based on the first digital output signals. Additionally or alternatively, the first converter controller may be configured to determine whether a priority of the first converter controller is greater than a priority of the second converter controller. In such embodiments, to activate the first RDC may include to activate the first RDC in response to a determination that the priority of the first converter controller is greater than the priority of the second converter controller and transmit, over the first communication bus and to the second converter controller, a notification that the first RDC has been activated. Additionally, in such embodiments, the second converter controller may be configured to determine whether a priority of the second converter controller is greater than a priority of the first converter controller and await receipt of the notification from the first converter controller in response to a determination that the priority of the second converter controller is not greater than the priority of the first converter controller.

In some embodiments, the third converter controller may be configured to activate the third RDC to receive analog output signals from the second resolver and convert the analog output signals received from the second resolver to second digital output signals indicative of an angle and a speed of the shaft; control, in response to activation of the third RDC, operation of the third power converter based on the second digital output signals; and transmit the second digital output signals to the first converter controller and the second converter controller over the second communication bus. In such embodiments, the first converter controller may be configured to receive the second output digital signals from the third converter controller over the second communication bus and determine a first control strategy for controlling the first converter based on the first digital output signals and the second digital output signals. Additionally, in such embodiments, to control operation of the first power converter may include to control operation of the first power converter based on the first control strategy. Furthermore, in such embodiments, the second converter controller may be configured to receive the first digital output signals from the first converter controller over the first communication bus; receive the second digital output signals from the third converter controller over the second communication bus; determine a second control strategy for controlling the second converter based on the first digital output signals and the second digital output signals; and control operation of the second converter based on the second control strategy.

Additionally, in some embodiments, the first converter controller may be configured to detect an error in operation of the first RDC and, in response to detection of the error, deactivate the first RDC and transmit a notification that the first RDC has been deactivated to the second converter controller via the first communication bus. Additionally, in such embodiments, the second converter controller may be configured to receive the notification that the first RDC has been deactivated from the first converter controller via the first communication bus; activate the second RDC to receive analog output signals from the first resolver and convert the analog output signals received from the first resolver to third digital output signals indicative of an angle and a speed of the shaft; control, in response to activation of the second RDC, operation of the second power converter based on the third digital output signals; and transmit the third digital output signals to the first converter controller and the third converter controller over the first communication bus. Further, in such embodiments, the first converter controller may be configured to receive the third digital output signals from the second converter controller over the first communication bus, receive the second digital output signals from the third converter controller over the second communication bus, determine a control strategy for controlling the first converter based on the second digital output signals and the third digital output signals, and control operation of the first converter based on the control strategy.

According to yet another aspect of the disclosure, a method for controlling operation of a plurality of power converters may include activating, by a first converter controller, a first resolver-to-digital converter (RDC) of the first converter controller communicatively coupled to a resolver to receive analog output signals from the resolver. The resolver may be coupled to a shaft of an electric machine. The method may also include setting, by the first converter controller, a transceiver of a communication circuit of the first converter controller communicatively coupled to a communication bus to transmit; transmitting, by the transceiver of the first converter controller and to a second converter controller over the communication bus, a first notification that the first RDC has been activated; converting, by the first RDC and in response to activating the first RDC, the analog output signals to first digital output signals indicative of an angle and a speed of the shaft; controlling, by the first converter controller and based on the first digital output signals, operation of a first power converter coupled to a first set of windings of the electric machine; transmitting, by the transceiver of the first converter controller and over the communication bus, the first digital output signals to the second converter controller; and receiving, by a transceiver of a communication circuit of the second converter controller communicatively coupled to the communication bus, the first notification from the first converter controller; receiving, by the transceiver of the second converter controller and over the communication bus, the first digital output signals; and controlling, by the second converter controller and based on the first digital output signals, operation of a second power converter coupled to a second set of windings of the electric machine.

In some embodiments, the method may include detecting, by the first converter controller, an error in operation of the first RDC; deactivating, by the first converter controller and in response to detecting the error, the first RDC; transmitting, by the transceiver of the first converter controller and to the second converter controller over the communication bus, a second notification that the first RDC has been deactivated; setting, by the first converter controller and subsequent to transmitting the deactivation notification, the transceiver of the first converter controller to receive. The method may also include receiving, by the transceiver of the second converter controller, the second notification from the first converter controller; activating, by the second converter controller and in response to receiving the second notification, a second RDC of the second converter controller communicatively coupled to the resolver to receive analog output signals from the resolver; setting, by the second converter controller and in response to activating the second RDC, the transceiver of the second converter controller to transmit; and transmitting, by the transceiver of the second converter controller and in response to activating the second RDC, a third notification to the first converter controller over the communication bus. The third notification may indicate that the second RDC has been activated. The method may also include converting, by the second RDC, the analog output signals to second digital output signals indicative of an angle and a speed of the shaft; controlling, by the second converter controller and based on the second digital output signals, operation of the second power converter; and transmitting, by the transceiver of the second converter controller and over the communication bus, the second digital output signals to the first converter controller.

Additionally, in some embodiments, the method may further include receiving, by the transceiver of the first converter controller, the second digital output signals and controlling, by the first converter controller and based on the second digital output signals, operation of the first power converter. In some embodiments, detecting the error in operation of the first RDC may include determining whether the first digital output signals are valid.

According to yet a further aspect of the disclosure, a method for controlling operation of a plurality of power converters may include determining, by a first converter controller of a plurality of converter controllers, a priority of the first converter controller. Each converter controller of the plurality of converter controllers may include a resolver-to-digital converter (RDC) coupled to a resolver and wherein the resolver is coupled to a shaft of a multi-phase electric machine. The method may also include determining, by the first converter controller, whether the priority of the first converter controller is greater than a corresponding priority of each other converter controller of the plurality of converter controllers; activating, in response to a determination that the priority of the first converter controller is greater than the corresponding priority of each other converter controller of the plurality of converter controllers, the RDC of the first converter controller; converting, by the RDC of the first converter controller, analog output signals received from the resolver to first digital output signals indicative of an angle and a speed of the shaft; controlling, by the first converter controller and based on the first digital output signals, operation of a first power converter coupled to a first set of windings of the multi-phase electric machine; and transmitting, by the first converter controller and over the communication bus, the first digital output signals to each converter controller of the plurality of converter controllers.

In some embodiments, determining the priority of the first converter controller may include determining the priority of the first converter controller from a look-up table stored by the first converter controller. Additionally, in some embodiments, determining whether the priority of the first converter controller is greater than the corresponding priority of each other converter controller of the plurality of converter controllers may include determining the corresponding priority of each other converter controller of the plurality of converter controllers from the lookup table and comparing the priority of the first converter controller to the priority of each other converter controller of the plurality of converter controllers.

Additionally, in some embodiments, determining whether the priority of the first converter controller is greater than the corresponding priority of each other converter controller of the plurality of converter controllers may include receiving, over the communication bus, the corresponding priority of each other converter controller of the plurality of converter controllers and comparing the priority of the first converter controller to the priority of each other converter controller of the plurality of converter controllers. In some embodiments, the method may also include deactivating, by the first converter controller, the first RDC; transmitting, by the first converter controller and over the communication bus, a notification to each other converter controller of the plurality of converter controllers that the first RDC has been deactivated; and determining, by each other converter controller of the plurality of converter controllers and in response to receiving the notification from the first converter controller, whether the priority of the corresponding other converter controller of the plurality of converter controllers is greater than the corresponding priority of each other converter controller of the plurality of converter controllers.

DETAILED DESCRIPTION OF THE DRAWINGS

Figure 1:
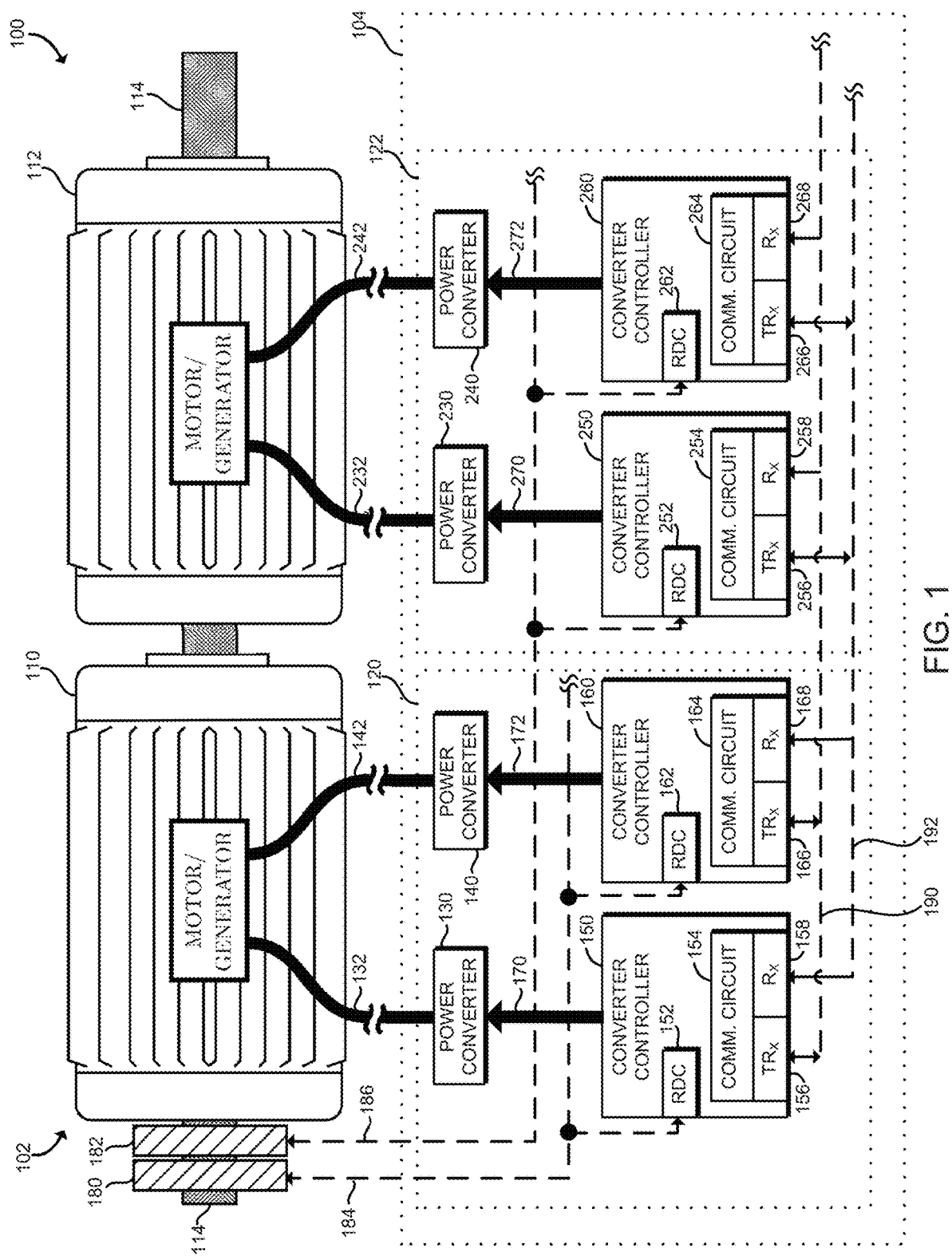
FIG. 1 is a simplified diagram of at least one embodiment of a multi-machine drive system including multiple electric machines, redundant resolvers, and a group of converter controllers coupled to each resolver and configured to share shaft information via a corresponding communication bus.

While the concepts of the present disclosure are susceptible to various modifications and alternative forms, specific illustrative embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

Some of disclosed embodiments may be implemented in hardware, firmware, software, or any combination thereof. Some disclosed embodiments may also be implemented as instructions carried by or stored on one or more machine-readable (e.g., computer-readable) storage media, which may be read and executed by one or more processors, processing circuitry, or other electronic device. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures.

Additionally, the inclusion of a structural or method feature in a particular figure is not meant to imply that such feature is required in all embodiments and, in some embodiments, may not be included or may be combined with other features.

For the purposes of promoting an understanding of the principles of the disclosure, reference will now be made to a number of illustrative embodiments illustrated in the drawings and specific language will be used to describe the same.

Various systems for controlling operation of an electric machine or group of electric machines using redundant shaft information are disclosed herein. In each system, the shaft information is indicative of an angle and speed of a motor shaft to which each associated electric machine is coupled. The disclosed systems include a multi-machine and/or multi-phase drive system and one or more independent control systems, which are configured to control the operation of the associated drive system. To do so and as discussed in more detail below, each control system includes one or more converter controllers configured to control the operation of an associated power converter that, in turn, controls the operation of a corresponding electric machine based on input signals received from the associated converter controller.

Redundancy of the shaft information is provided in the disclosed embodiments by the inclusion of duplicative resolvers attached to the common motor shaft and/or by the sharing of shaft information between converter controllers. For example, in some embodiments, two or more resolvers may be attached to the motor shaft and independently produce the associated shaft information. As such, should one resolver fail or otherwise operate erroneously, the shaft information provided by another included resolver may be used by one or more converter controllers of the system.

Additionally, in some embodiments, two or more converter controllers may be communicatively coupled to the same resolver to receive the same shaft information. In such embodiments, as discussed in more detail below, only one resolver-to-digital converter (RDC) of each converter controller coupled to the same resolver is activated at a given time to energize the corresponding resolver and receive the analog shaft information produced by that resolver. The converter controller having the active RDC converts the analog shaft information into digital shaft information indicative of the speed and angle of the motor shaft and may use the digital shaft information to control operation of the associated power converter as discussed in more detail below. Additionally, the converter controller communicates the converted digital shaft information to other converter controllers of the system via an interconnected communication bus. As such, other converter controllers coupled to the same resolver, but having an inactive RDC, may also utilize the received digital shaft information to control the associated power converter.

Furthermore, in some embodiments, the converter controller having the active RDC may also transmit the digital shaft information to converter controllers coupled to a different resolver, which may determine whether to use the received digital shaft information or the shaft information determined from the analog shaft information provided by the resolver to which that converter controller is coupled. Similarly, the converter controller coupled to the other resolver may also share its converted digital shaft information with other converter controllers via another communication bus. In this way, each converter controller has access to a number of "copies" of the digital shaft information equal to the number of resolvers included in the respective system and may determine which digital shaft information to use in controlling its associated power converted based on various criteria as discussed below. Because only one RDC per resolver should be activated at a time, the converter controllers may also use the communication busses to synchronize which converter controller is to activate its RDC at any particular time based a priority of each converter controller and/or other parameters as discussed below.

Referring now to FIG. 1, in an illustrative embodiment, a system 100 for controlling operation of electric machines includes a multi-machine drive system 102 and a multi-machine control system 104 communicatively coupled to the multi-machine drive system 102 to control the functions thereof. The multi-machine drive system 102 illustratively includes a first electric machine 110 and a second electric machine 112, but may include additional electric machines in other embodiments depending on the torque and power requirements. Each of the electric machines 110, 112 is coupled to, or otherwise includes, a common motor shaft 114 and is illustratively embodied as an electric motor/generator. That is, each of the electric machines 110, 112 may operate as an electric motor to provide an amount of torque to the motor shaft 114 for driving an output system (e.g., a gear set of an electric vehicle) under normal conditions and, optionally, operate as an electric generator to produce electric power under other conditions (e.g., during regenerative braking conditions). Each of the electric machines 110, 112 illustratively includes two sets of three-phase windings, but may include additional sets of three-phase, five-phase, or other multi-phase windings in other embodiments depending on the particular requirements of the application.

The multi-machine control system 104 includes a separate control sub-system for each resolver included in the system 100. As shown in FIG. 1, the illustrative system 100 includes two resolvers 180, 182 coupled to the motor shaft 114. As such, the illustrative multi-machine control system 104 includes a first control sub-system 120 and a second control sub-system 122. The first control sub-system 120 is electrically coupled to the first electric machine 110 and configured to control the operation of the first electric machine 110. Similarly, the second control system 122 is electrically coupled to the second electric machine 112 and configured to control the operation of the second electric machine 112.

As shown in FIG. 1, each of the first and second control sub-systems 120, 122 includes an associated pair of a power converter and a corresponding converter controller for each set of windings of the respective electric machine 110, 112. As such, in the illustrative embodiment in which the electric machine 110 has two sets of windings, the first control sub-system 120 includes a first power converter 130 electrically coupled to a first set of windings (not shown) of the first electric machine 110 via a wire harness 132 and a second power converter 140 electrically coupled to a second set of windings (not shown) of the first electric machine 110 via a wire harness 142. Each power converter 130, 140 may be embodied as any type of power converter capable of producing energizing alternating current (AC) control signals to the electric machine 110 to control the operation of the electric machine 110 based on corresponding input signals (e.g., input gating signals). As such, the power converters 130, 140 may include electrical components, devices, and/or subsystems commonly found in typical power converters. Additionally, each wire harness 132, 142 may embodied as any type of wire harness capable of communicating the control signals from the power converters 130, 140 to the electric machine 110. The number and type of interconnects included in each wire harness 132, 142 may vary depending on the type of electric machine 110, the configuration of the power converters 130, 140, and/or other criteria.

The control sub-system 120 also includes a first converter controller 150 electrically coupled to the power converter 130 via interconnects 170 and a second converter controller 160 electrically coupled to the power converter 140 via interconnects 172. The interconnects 170, 172 may be embodied as any type of interconnect, wire, wire harness, or other communication interface capable of facilitating communication between the converter controllers 150, 160 and the power converters 130, 140. Although shown as separate components in FIG. 1, the power converters 130, 140 may be incorporated into the converter controllers 150, 160, respectively, in some embodiments. In such embodiments, the interconnects 170, 172 may be embodied as electrical traces, wires, or other "on-board" connections.

Each converter controller 150, 160 is also communicatively coupled to the first resolver 180 via a wire harness 184. The first resolver 180 may be embodied as any type of resolver capable of being energized by one of the converter controllers 150, 160 to produce analog output signals indicative of the angle and speed of the motor shaft 114. For example, in the illustrative embodiment, the first resolver 180 is embodied as a standard "off-the-shelf" resolver. The wire harness 184 may embodied as any type of wire harness capable of communicating the analog output signals from the resolver 180 to the converter controllers 150, 160. The number and type of interconnects included in the wire harness 184 may vary depending on the type of resolver 180 and/or the structure/operation of the converter controllers 150, 160.

The converter controllers 150, 160 are illustratively similar in design, as discussed in more detail below in regard to FIG. 2, and may be embodied as any type of converter controller capable of performing the functions described herein. Each illustrative converter controller 150, 160 includes a resolver-to-digital converter (RDC) 152, 162, respectively, coupled to the first resolver 180 via the wire harness 184 and a communication circuit 154, 164, respectively. Each communication circuit 154, 164 illustratively includes a transceiver 156, 166, respectively, coupled to a first communication bus 190 and a separate receiver 158, 168, respectively, coupled to a second communication bus 192, which facilitates the sharing of shaft information between the converter controllers of the system 100 as discussed in more detail below. In embodiments in which the multi-machine control system 104 includes additional control sub-systems (and additional corresponding resolvers), each communication circuit 154, 164 may include additional receivers coupled to an additional communication bus to receive shaft information from the additional control sub-systems. Regardless, the communication busses 190, 192 are each illustratively embodied as a serial communication bus. As such, the communication circuits 154, 164 may utilize any suitable serial communication protocol or standard to effect communication across the communication busses. For example, in the illustrative embodiments, the communication circuits 154, 164 are configured to utilize the RS-485 serial communication standard.

Although the illustrative control sub-system 120 includes only two pairs of power converters 130, 140 and associated converter controllers 150, 160, it should be appreciated that the control sub-system 120 may include additional pairs of power converters and associated converter controllers in other embodiments. For example, in embodiments in which the electric machine 110 includes more than two windings, the control sub-system 120 may include an additional pair of a corresponding power converter and associated converter controller for each additional winding. Such additional converter controllers may be arranged similar to the above-described converter controllers 150, 160 and include an RDC electrically coupled to the interconnect 184 and a communication circuit having a transceiver electrically coupled to the communication bus 190 and a receiver coupled to the communication bus 192.

The control sub-system 122 is substantially similar to the control sub-system 120 described above and includes similar components as the control sub-system 120, the description of which is equally applicable to like components of the control sub-system 122. For example, the control sub-system 122 includes a first power converter 230 electrically coupled to a first set of windings (not shown) of the second electric machine 112 via a wire harness 232 and a second power converter 240 electrically coupled to a second set of windings (not shown) of the second electric machine 112 via a wire harness 242. Each of the power converters 230, 240 is substantially similar to the power converter 130, 140 described above, and each of the wire harnesses 232, 242 is substantially similar to the wire harnesses 132, 142 described above.

The control sub-system 122 also includes a first converter controller 250 electrically coupled to the power converter 230 via interconnects 270 and a second converter controller 260 electrically coupled to the power converter 240 via interconnects 272. Each converter controller 250, 260 is also communicatively coupled to the second resolver 182 via a wire harness 186, which is similar to the wire harness 184 described above. Additionally, the second resolver 182 is substantially similar to first resolver 180 and is configured to produce analog output signals indicative of the angle and speed of the motor shaft 114 in response to an excitations signal from one of the converter controllers 250, 260.

The converter controllers 250, 260 are substantially similar in design to the converter controllers 150, 160 described above. Each illustrative converter controller 250, 260 includes an RDC 252, 262, respectively, coupled to the second resolver 182 via the wire harness 186 and a communication circuit 254, 264, respectively. The RDCs 252, 262 are similar to the RDCs 152, 162, and the communication circuits 254, 264 are similar to the communication circuits 154, 164 described above in regard to converter controllers 150, 160. For example, each communication circuit 254, 264 includes a transceiver 256, 266, respectively, coupled to the second communication bus 192 and a separate receiver 258, 268, respectively, coupled to the first communication bus 190 to facilitate the sharing of shaft information with the other converter controllers of the system 100 as discussed in more detail below. Again, as discussed above, the communication busses 190, 192 are each illustratively embodied as a serial communication bus, and the communication circuits 254, 264 are configured to utilize the RS-485 serial communication standard to effect communications across the communication busses 190, 192.

Similar to the control sub-system 120, although the illustrative control sub-system 122 includes only two pairs of power converters 230, 240 and associated converters controller 250, 260, it should be appreciated that the control sub-system 122 may include additional pairs of power converters and associated converter controllers in other embodiments. For example, in embodiments in which the electric machine 112 includes more than two windings, the control sub-system 122 may include an additional pair of a corresponding power converter and associated converter controller for each additional winding. Such additional converter controllers may be arranged similar to the above-described converter controllers 250, 260 and include an RDC electrically coupled to the interconnect 186 and a communication circuit having a transceiver electrically coupled to the communication bus 192 and a receiver coupled to the communication bus 190.

In operation, each power converter 130, 140, 230, 240 is configured to control operation of the associated electric machine 110, 112 based on control signals received from the associated converter controller 150, 160, 250, 260, respectively. Each converter controller 150, 160, 250, 260 is configured to generate the control signals based on analog output signals indicative of shaft information of the motor shaft 114 (e.g., the speed and angle of the shaft 114) received from the associated resolver 180, 182 and/or on digital output signals indicative of the shaft information received from another converter controller 150, 160, 250, 260 of the system 100 via its corresponding communication circuit 154, 164, 254, 264.

To do so, as discussed in more detail below, each group of converter controllers 150, 160 and 250, 260 communicate amongst themselves to determine which converter controller has priority for each control sub-system 120, 122. The converter controllers 150, 160, 250, 260 may be hardcoded with their individual priority or may otherwise determine a relative priority using any suitable methodology. The converter controller having priority in each control sub-system 120, 122 activates its RDC, while the RDC of the other converter controllers of that control sub-system 120, 122 remains un-activated or otherwise in a "stand by" mode. In this way, only one RDC per resolver 180, 182 is activated at a time. For example, if converter controller 150 is determined to have priority for the control sub-system 120, the converter controller 150 activates the RDC 152 while the RDC 162 of the converter controller 160 remains in "stand by" mode. In doing so, the RDC 152 produces an excitation output signal, which is supplied to the resolver 180 via the wire harness 184. In response to the excitation output signal, the resolver 180 is configured to produce analog output signals indicative of the present speed and angle of the motor shaft 114, which are received by the RDC 152 of the converter controller 150.

The converter controller 150 converts the analog output signals to digital output signals indicative of the shaft information and may control the operation of the power converter 130 based on the converted digital output signals (or based on digital output signals received from another converter controller 160, 250, 260 of the system 100 as discussed in more detail below). Additionally, because the converter controller 150 has priority for the control sub-system 120, the converter controller 150 sets the transceiver 156 of the communication circuit 154 to transmit mode and subsequently transmits the converted digital output signals to the other converter controllers 160, 250, 260 of the system 100 via the communication bus 190. Furthermore, the converter controller 150 may receive other digital output signals indicative of the shaft information of the motor shaft 114 from the converter controller 250, 260 of the control sub-system 122 having priority for the control sub-system 122 via the receiver 158 and the second communication bus 192.

The other converter controllers of the control sub-system 120 (e.g., the converter controller 160) which do not have priority, deactivate or otherwise set their respective RDCs to "stand by" mode such that only one RDC of all the RDCs coupled to a single resolver 180, 182 is activated at any point in time. Additionally, the other non-priority converter controllers of the control sub-system 120 (e.g., the converter controller 160) set their corresponding transceivers to receive mode to facilitate receiving the digital output signals from the priority converter controller 150. Furthermore, similar to the converter controller 150, the converter controller 160 (and other non-priority converter controllers of the control sub-system 120) also receives other digital output signals indicative of the shaft information of the motor shaft 114 from the converter controller 250, 260 of the control sub-system 122 having priority via the receiver 168 and the second communication bus 192.

The converter controllers 250, 260 of the control sub-system 122 operate in a similar manner to the converter controllers 150, 160. As such, redundancy of shaft information is provided in the system 100 because each converter controller 150, 160, 250, 260 receives and/or produces a number of "copies" of the shaft information equal to the number of resolvers included in the system 100. Accordingly, should one of the resolvers 180, 182 or an RDC 152, 162, 252, 262 of a converter controller 150, 160, 250, 260 fail, each converter controller 150, 160, 250, 260 is capable of continued operation by using a redundant "copy" of the shaft information as described in more detail below.

Figure 2:
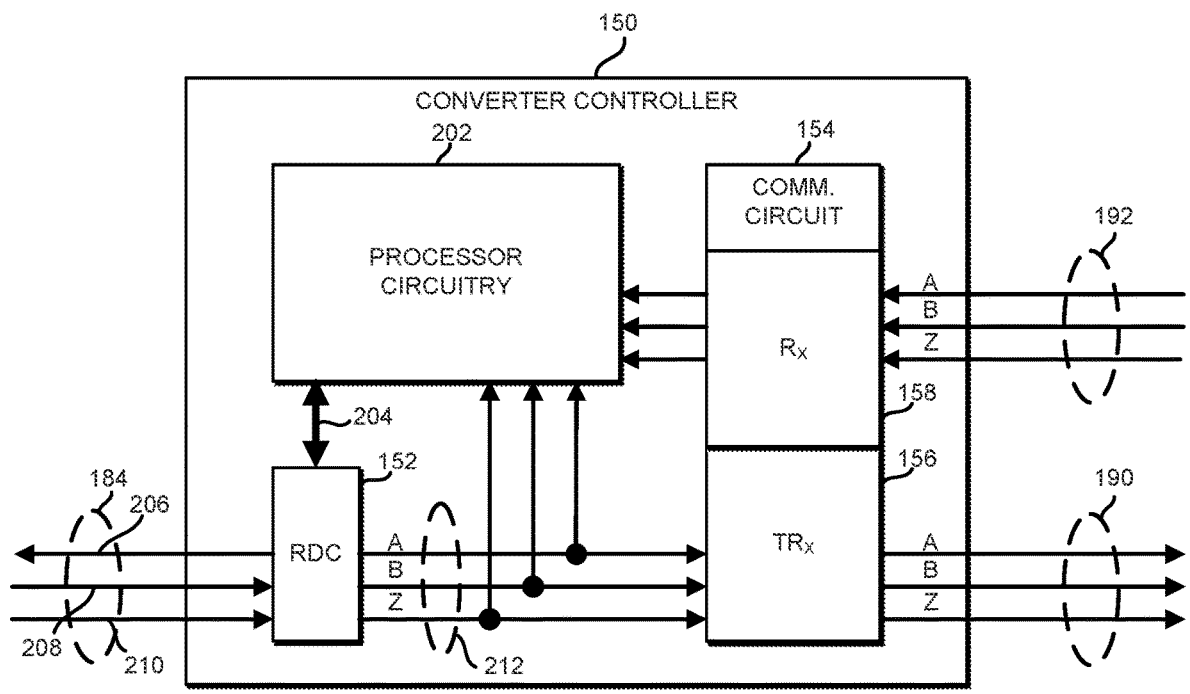
FIG. 2 is a simplified block diagram of at least one embodiment of a converter controller of the system of FIG. 1 including a resolver-to-digital converter (RDC)
Figure 3:
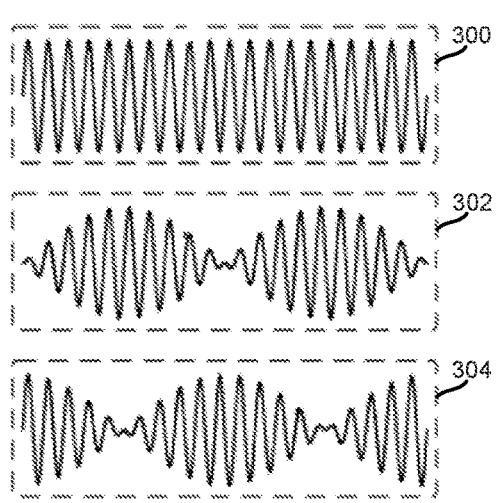
FIG. 3 is a simplified illustration of the signal waveforms of the excitation signal produced by the RDC of the converter controller of FIG. 2 and analog output signals received by the RDC from the coupled resolver while the RDC is activated.
Figure 4:
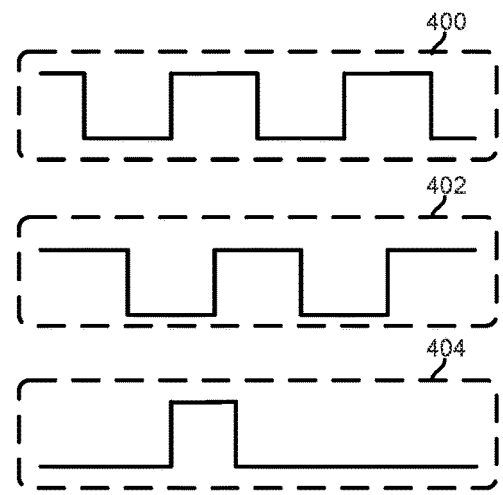
FIG. 4 is a simplified illustration of the signal waveforms of the digital output signals produced by the RDC of the converter controller of FIG. 2 while the RDC is activated.

Referring now to FIGS. 2-4, further details of the structure and operation of the converter controller 150 are shown. As discussed above, each converter controller 150, 160, 250, 260 of the system 100 has a similar design and functionality, which may provide modularity and reduce cost in the system 100. As such, although FIGS. 2-4 are illustrated and described below in reference only to converter controller 150 for clarity of the description, it should be appreciated that such description is equally applicable to the other converter controllers of the system 100, including converter controllers 160, 250, 260. For example and without limitation, the description of the RDC 152, the communication circuit 154, the resolver 180, and the wire harness 184 provided below are equally applicable to the RDCs 162, 252, 262, the communication circuits 164, 254, 264, the resolver 182, and the wire harness 186, respectively.

As shown in FIG. 2, the converter controller 150 includes a processor circuitry 202, the RDC 152, and the communication circuit 154. Of course, the converter controller 150 may include additional circuitry and/or components commonly found in a converter controller. The processor circuitry 202 may be embodied any type of processor, circuit, component, or collection thereof capable of performing the functions described herein. For example, in the illustrative embodiment, the processor circuitry 202 is embodied as a digital signal processor.

The processor circuitry 202 is communicatively coupled to the RDC 152 via an interconnect 204 and is configured to control the functions of the RDC 152. For example, the processor circuitry 202 is configured to control the RDC 152 to produce the excitation output signal, which is transmitted to the resolver 180 via an interconnect 206 of the wire harness 184. An illustrative waveform 300 of an excitation signal that may be generated by the RDC 152 is shown in FIG. 3. In response to the receipt of the excitation signal and in response to the physical motion of the motor shaft 114, the resolver 180 is configured to generate analog output signals indicative of the shaft information (e.g., an angle and speed) of the motor shaft 114. In the illustrative embodiment, the resolver 180 generates two analog output signals that have a 90 degree phase shift relative to each other. For example, as shown in FIG. 3, the resolver 180 may produce a waveform 302 of a sine output signal on an interconnect 208 and a waveform 304 of a cosine output signal on an interconnect 210 of the wire harness 184, which are received by the RDC 152.

In some embodiments, the RDC 152 may convert the sine and cosine analog output signals into absolute angle and speed information, which is provided directly to the processor circuitry 202 via the interconnect 204. Additionally or alternatively, the RDC 152 converts the sine and cosine analog output signals to digital output signals indicative of the shaft information. For example, the RDC 152 may convert the digital output signals into incremental encoder pulses A, B, Z, which are provided to the processor circuitry and the transceiver 156 of the communication circuit 154 via interconnects 212. An illustrative waveform 400, 402, 404 of the encoder pulses A, B, Z is show in FIG. 4, respectively. As can be seen from the waveforms 400, 402, 404, the digital output encoder pulses A and B have a 50% duty cycle and +90° or −90° phase shift relative to each other. The digital output encoder pulse Z includes only a single pulse per fundamental period of the analog output signals of the resolver 180. It should be appreciated that the phase shift sign between the A and B encoder pulses is indicative of the direction of rotation of the motor shaft 114, and the number of pulses per second of the A and B encoder pulses is indicative of the angular speed of the motor shaft 114.

In embodiments in which the RDC 152 generates the encoder pulses A, B, Z, the processing circuitry 202 is configured to convert the received encoder pulses A, B, Z into control signals (e.g., gating signals) for controlling the angle and speed of the motor shaft. To do so, the processing circuitry 202 transmits those control signals to the power converter 130 as discussed above. Although the RDC 152 is shown in FIG. 2 as a separate component from the processor circuitry 202, the RDC 152 (or portions thereof) may be included in the processor circuitry 202 in some embodiments. For example, in embodiments in which the processor circuitry 202 is embodied as a digital signal processor, the processor circuitry 202 may be configured to generate the excitation signal for the resolver 180 directly.

As discussed above, redundancy of the shaft information is provided by the sharing of the shaft information between the converter controller 150, 160, 250, 260 of the system 100. As such, the RDC 152 also provides the incremental encoder pulses A, B, Z to the transceiver 156 of the communication circuit 154 for transmitting the digital output signals to other converter controllers 150, 250, 260 of the system 100 via the communication bus 190. Additionally, the converter controller 150 may receive digital output signals (i.e., encoder pulses A, B, Z) indicative of the shaft information from another converter controller 250, 260 of the other control sub-system 122 (i.e., from the particular converter controller 250, 260 having priority) via the receiver 158 of the communication circuit 154 and the communication bus 192.

It should be appreciated that the above description of the converter controller 150 assumes the converter controller 150 has been determined to have priority for the control sub-system 120. In embodiments in which the converter controller 150 does not have priority, the RDC 152 is not activated and, as such, does not produce the incremental encoder pulses A, B, Z. Rather, in such situations, the converter controller 150 receives the digital output signals (i.e., the encoder pulses A, B, Z) from the particular converter controller of the control sub-system 120 that has priority (e.g., controller 160) over the communication bus 190 via the transceiver 156, which has been set to receive mode in those situations. Additionally, in such situations and discussed above, the converter controller 150 receives the digital output signals (i.e., the encoder pulses A, B, Z) via the priority converter controller of the control sub-system 122 over the communication bus 192 via the receiver 158. As discussed in more detail below, the converter controller 150 may use any suitable control strategy to determine which (or both) group of digital output signals to use. For example, the converter controller 150 may select a preferred one of the received digital output signals (e.g., if one is determined to be less error prone than the other) or combine/average the digital output signals.

Figure 5:
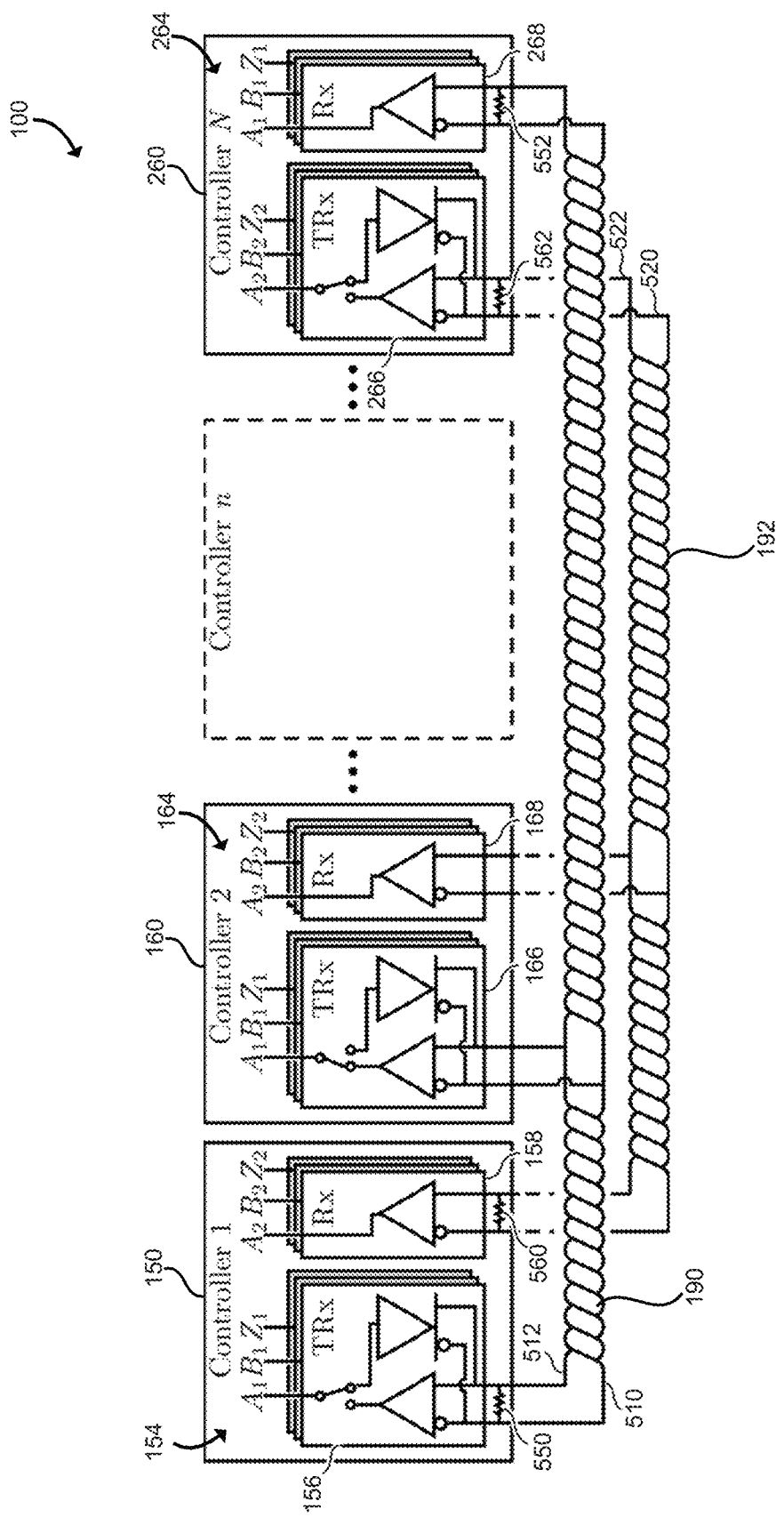
FIG. 5 is a simplified block diagram of a communication circuit of each of the converter controllers of the system of FIG. 1.

Referring now to FIG. 5, an embodiment of the interconnection between the communication circuits 154, 164, 254, 264 of the converter controllers 150, 160, 250, 260 via the communication busses 190, 192 is shown. Illustratively, each of the communication bus 190, 192 of the system 100 is embodied as a set of three twisted differential lines, one to carry each of the encoder pulses A, B, Z. It should be appreciated that the use of differential signaling to carry high-frequency pulses provides a level of common-mode noise immunity and facilitates signal integrity.

In FIG. 5, only the twisted differential pairs 510, 512 and 520, 522 for the encoder pulse A, and associated interconnection, of the communication busses 190, 192, respectively, are shown for clarity of the figure. However, it should be appreciated that each of the twisted differential lines for encoder pulses B and Z of communication busses 190, 192 have a similar structure and interconnection. As shown in FIG. 5, to ensure proper data transmission, each twisted differential pair 510, 512 and 520, 522 is terminated at both ends with a corresponding resistor 550, 552 and 560, 562, respectively. For example, the resistor 550 is coupled across the inverting line and the non-inverting line of the twisted differential pair 510, 512 at the transceiver 156 of the converter controller 150, and a corresponding resistor 552 is coupled across the inverting line and the non-inverting line of the twisted differential pair 510, 512 at the receiver 268 of the converter controller 260. The value of the resistors 550, 552, 560, 562 is selected to substantially match the characteristic impedance of the associated twisted differential pairs 510, 512, 520, 522.

Figure 6:
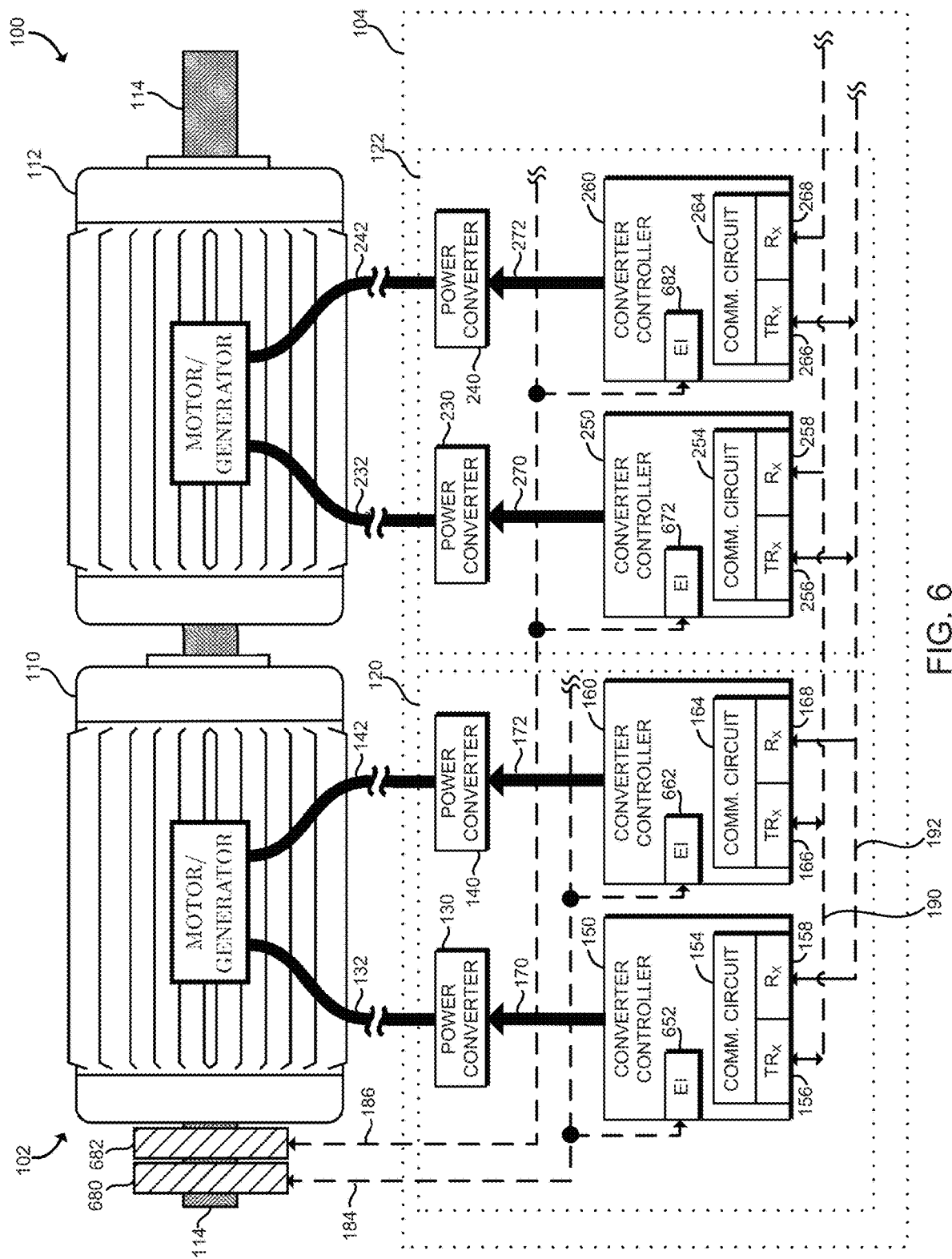
FIG. 6 is a simplified diagram of at least one other embodiment of a multi-machine drive system including multiple electric machines, redundant encoders, and a group of converter controllers coupled to each encoder and configured to share shaft information via a corresponding communication bus.
Figure 7:
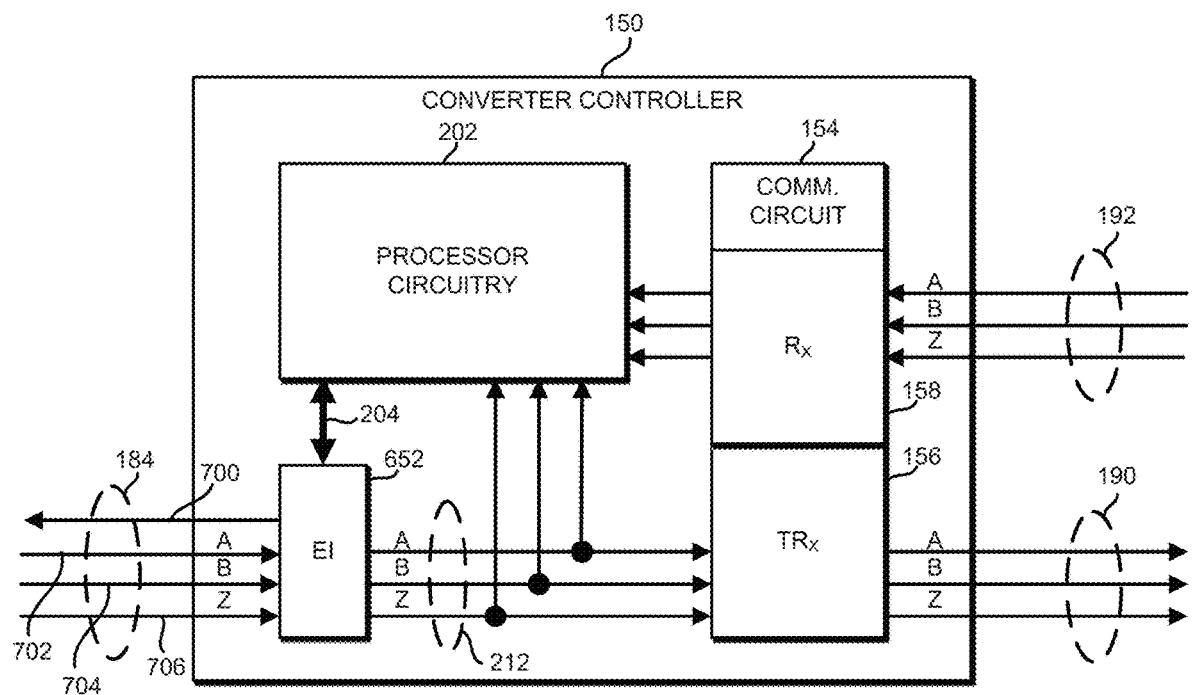
FIG. 7 is a simplified block diagram of at least one embodiment of a converter controller of the system of FIG. 6 including an encoder interface.
Figure 8:
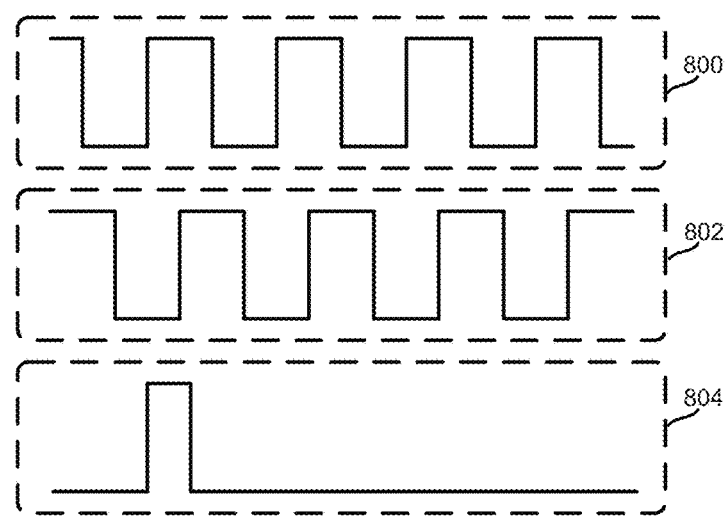
FIG. 8 is a simplified illustration of the signal waveforms of the digital output signals produced by the encoder interface of the converter controller of FIG. 7 while the encoder interface is activated.

Referring now to FIGS. 6-8, in other embodiments, the incremental encoders 680, 682 may be used in place of the resolvers 180, 182. In such embodiments, the RDC 152, 162, 252, 262 of the converter controllers 150, 160, 250, 260 is replaced with an encoder interface (EI) 652, 662, 672, 682, respectively. Generally, the structure of the encoder interfaces 652, 662, 672, 682 is less complex than that of the RDC 152, 162, 252, 262 because the encoder pulses A, B, and Z can be obtained directly from the outputs of the incremental encoders 680, 682. However, in some embodiments, the encoder interface (EI) 652, 662, 672, 682 may perform some amount of voltage level conversion on the encoder pulses received from the incremental encoders 680, 682, as well as provide a power supply to the incremental encoders 680, 682 as discussed below.

As shown in FIG. 7, the structure of the converter controller 150 is similar to the structure described above in regard to FIG. 2, except that the RDC 152 is replaced with the encoder interface 652 as discussed above. Additionally, similar to the description of FIG. 2, although FIGS. 7 and 8 are illustrated and described below in reference only to converter controller 150 for clarity of the description, it should be appreciated that such description is equally applicable to the other converter controllers of the system 100, including converter controllers 160, 250, 260.

In operation, the encoder interface 652 is configured to generate or otherwise provide a supply voltage to the incremental encoder 680 via an interconnect 700 of the wire harness 184. In response to the supply voltage and based on the physical motion of the motor shaft 114, the incremental encoder 680 is configured to generate the digital output signals indicative of the shaft information (e.g., an angle and speed) of the motor shaft 114. In the illustrative embodiment, the encoder interface 652 generates the three encoder pulses A, B, Z, which are received by the encoder interface 652 via interconnects 702, 704, 706, respectively, of the wire harness 184.

An illustrative waveform 800, 802, 804 of the encoder pulses A, B, Z is show in FIG. 8, respectively. The waveforms 800, 802, 804 are similar to the waveforms 400, 402, 404 described above. For example, the waveforms 800, 802 corresponding to the encoder pulses A and B have a 50% duty cycle and +90° or −90° phase shift relative to each other. The waveform 804 corresponding to the encoder pulse Z includes only a single pulse per fundamental period. Again, it should be appreciated that the phase shift sign between the A and B encoder pulses is indicative of the direction of rotation of the motor shaft 114, and the number of pulses per second of the A and B encoder pulses is indicative of the angular speed of the motor shaft 114. Similar to the RDC 152, the encoder interface 652 may provide encoder pulses A, B, Z to the processor circuitry 202 and to the communication circuit 154 for sharing to other converter controllers of the system 100.

Figure 9A:
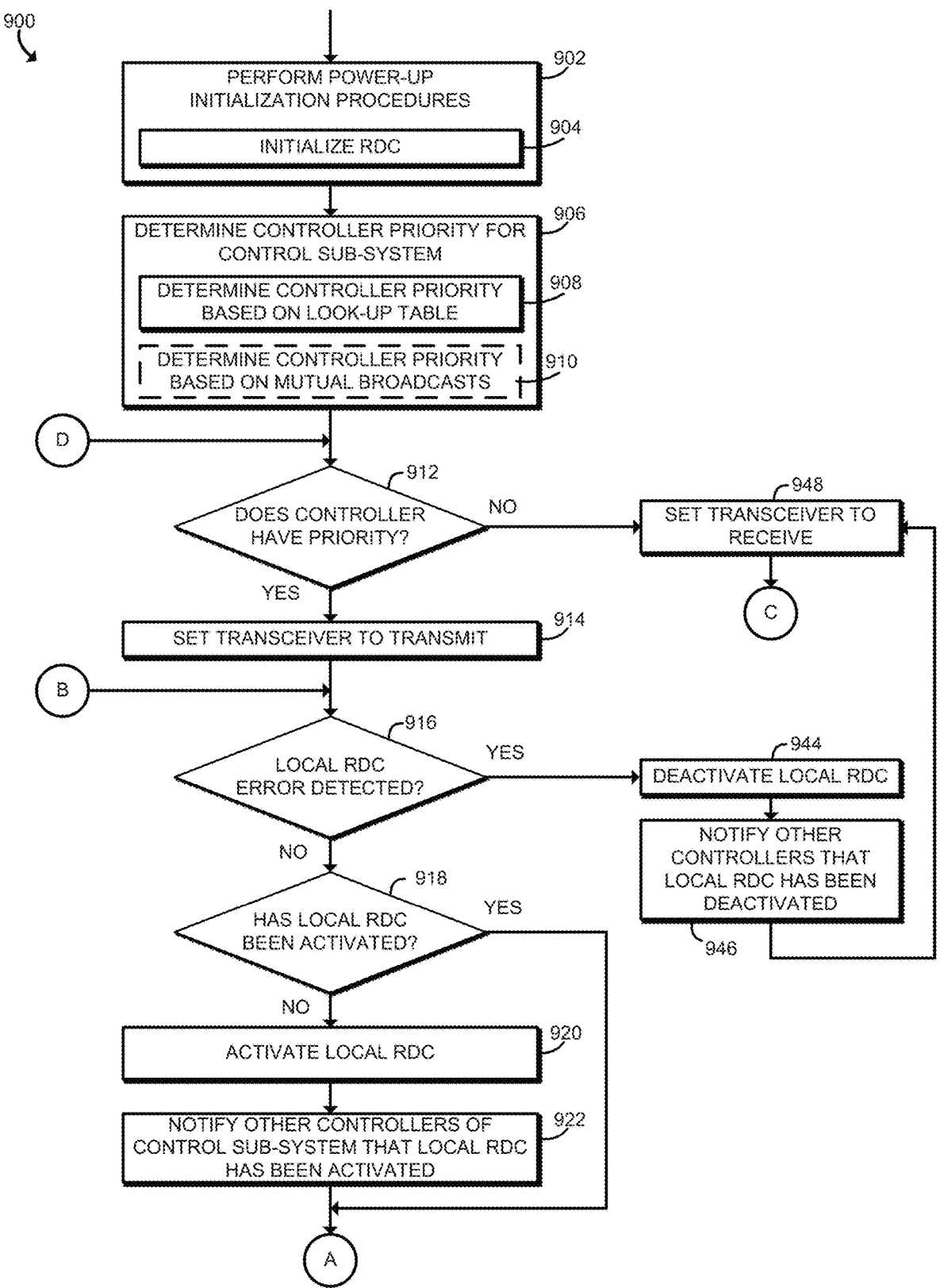
FIGS. 9A-9C is a simplified flow diagram of at least one embodiment of a method for controlling operation of a set of converter controllers configured to share shaft information via a corresponding communication bus, which may be executed by one or more converter controllers of the system of FIG. 1.
Figure 9B:
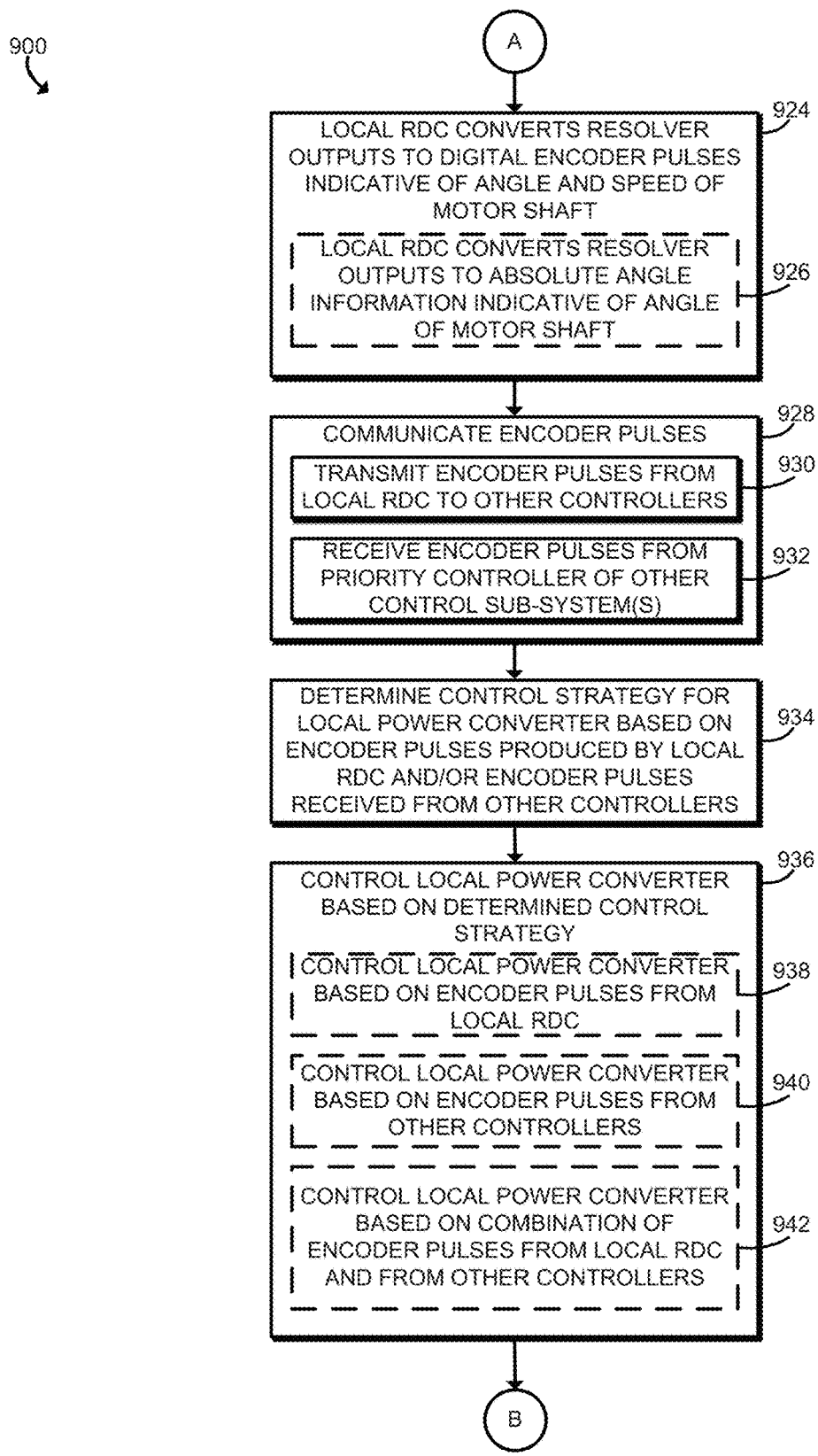
Figure 9C:
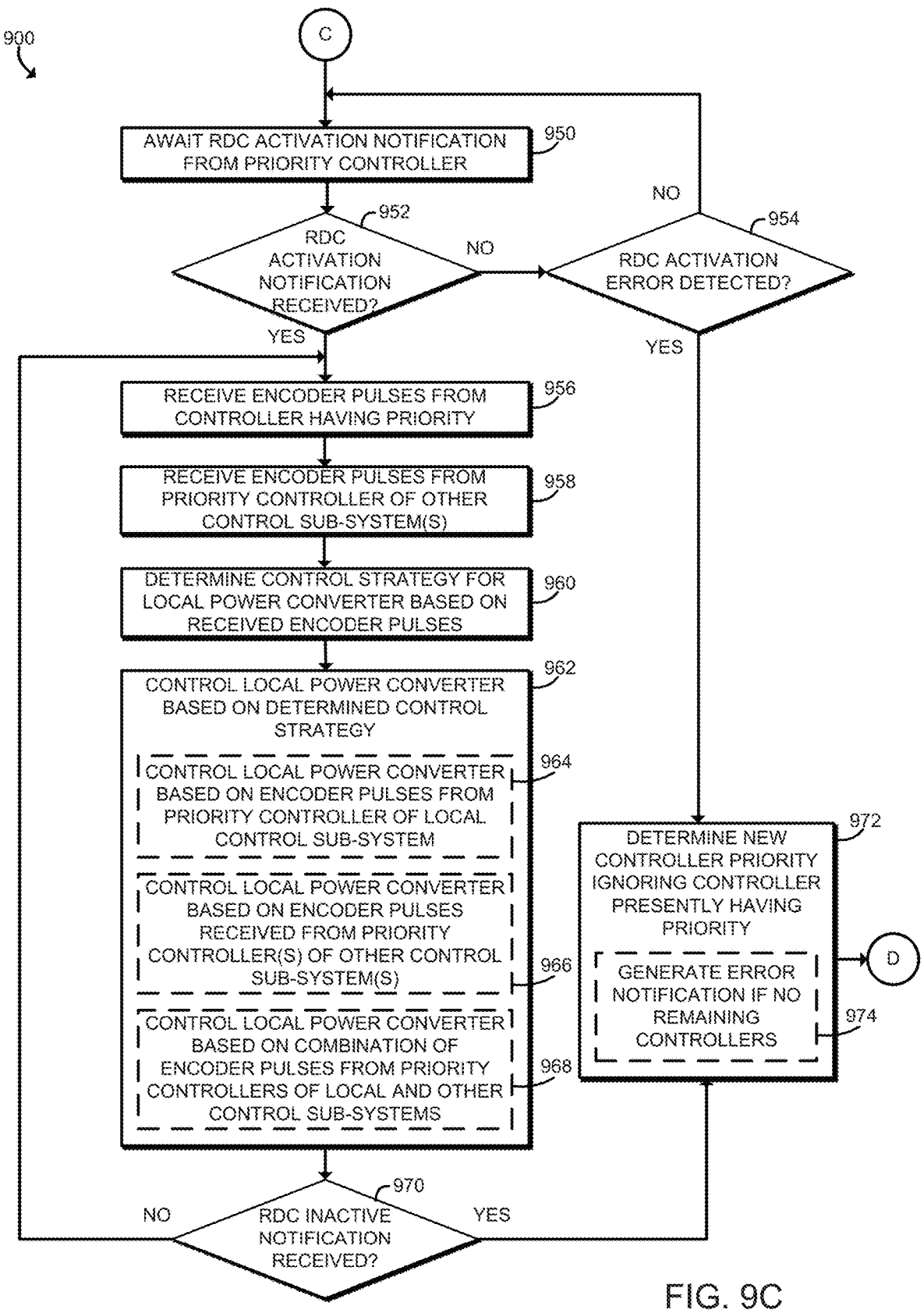

Referring now to FIGS. 9A-9C, in operation, each of the converter controllers 150, 160, 250, 260 (and other controllers) of the system 100 may execute a method 900 for controlling operation of a power converter. The method 900 may be embodied as a set of instructions executable by the processor circuitry 202 and/or other component of the converter controllers 150, 160, 250, 260 and which may be stored locally in a storage device of each converter controllers 150, 160, 250, 260 (e.g., a memory or other non-transitory machine-readable medium) or otherwise obtainable by the converter controllers 150, 160, 250, 260 (e.g., via retrieval from a remote storage location). The method 900 is described below in reference to its execution by the converter controller 150 with the understanding that such description is equally applicable to the other converter controllers of the multi-machine control system 104, including converter controller 160, 250, 260.

The method 900 begins with block 902 in which the converter controller 150 performs various power-up initialization procedures. For example, in block 904, the converter controller 150 may initialize the RDC 152, although the RDC 152 has not yet been activated. Of course, the converter controller 150 may perform other initialization routines and/or functions in block 902 in preparation for normal operation.

Subsequently, in block 906, the converter controller 150 determines the controller priority for its control sub-system, which illustratively is control sub-system 120 (or control sub-system 122 if the converter controller 250, 260 is executing the method 900). To do so, the converter controller 150 may utilize any suitable algorithm, method, or functionality to determine which converter controller of the control sub-system 120 (e.g., converter controller 150 or 160) has priority over the other converter controllers of the control sub-system 120. For example, in block 908, the converter controller 150 may look-up its priority number or other information via a look-up table stored on the converter controller 150 (e.g., in memory). Additionally, in some embodiments in block 910, the converter controller 150 may broadcast its priority value determined from its look-up table to other converter controllers of the control sub-system 120 via the communication bus 190. In this way, every converter controller of the local control sub-system 120 receives the priority value or information of every other converter controller of the control sub-system 120 and can compare its own priority to those received from the other converter controllers to determine whether it has priority over those other converter controllers of the control sub-system 120. Alternatively, in other embodiments, the converter controller 150 can use other mechanisms to determine its relative priority within the control sub-system 120. For example, in some embodiments, the converter controller 150 may receive an indication of its relative priority from an external source, such as a remote server.

Regardless, after the converter controller 150 has determined its relative priority, the method 900 advances to block 912 in which the converter controller 150 determines whether it has priority over all other converter controllers of the control sub-system 120. If so, the method 900 advances to block 914 in which the converter controller 150 sets the transceiver 156 of the communication circuit 154 to transmit mode. Subsequently, in block 916, the converter controller 150 determines whether any error has been detected in regard to its RDC 152. For example, the converter controller 150 may determine whether the RDC 152 initialized properly in block 904 or is otherwise operating correctly during later iterations of the method 900.

If the converter controller 150 determines that no error has been detected in regard to the RDC 152, the method 900 advances to block 918 in which the converter controller 150 determines whether the local RDC 152 has been activated previously. If not, the converter controller 150 activates the RDC 152 in block 920. Additionally, in block 922 the converter controller 150 transmits a notification to the other converter controllers of the control sub-system 120 that the converter controller 150 has activated its RDC 152. For example, the converter controller 150 may transmit a broadcast message to the other converter controllers (e.g., converter controller 160) via the communication bus 190. As discussed above, because an active RDC provides an excitation signal to the resolver 180, only one RDC should be activated typically at any point in time. As such, the converter controller 150 notifies the other converter controllers of the control sub-system 120 so that those other converter controllers can ensure their local RDC is deactivated or otherwise in a "stand-by" mode as discussed below.

If the converter controller 150 determines that RDC 152 has already been activated in block 918 or after the converter controller 150 has notified the other converter controllers of the control sub-system 120 that the RDC 152 has been activated in block 922, the method 900 advances to block 924 of FIG. 9B. In block 924, the RDC 152 generates and transmits the excitation signal to the resolver 180 via the wire harness 184 and, in turn, receives the analog outputs signals indicative of the shaft information (e.g., the angle and speed of the motor shaft 114) from the resolver 180. The converter controller 150 converts the analog output signals into the digital output signals (i.e., the digital encoder pulses A, B, Z as disused above), which is also indicative of the shaft information. As discussed above, in some embodiments in block 926, the RDC 152 may also convert the sine and cosine analog output signals into absolute angle and speed information, which is provided directly to the processor circuitry 202 via the interconnect 204.

Subsequently, in block 928, the converter controller 150 transmits the encoder pulses A, B, Z to other converter controllers of the system 100. For example, in block 930, the converter controller 150 transmits the digital output signals produced by the RDC 152 to the other non-priority converter controllers of the control sub-system 120 (e.g., to the converter controller 160) via the transceiver 156 and the communication bus 190. Additionally, in block 932, the converter controller 150 receives digital output signals (i.e., the encoder pulses A, B, Z) from the priority controller of the other control sub-systems of the system 100, such as control sub-system 122. That is, the converter controller 150 receives the digital output signals from the other priority controller via the receiver 158 and the communication bus 192. In this way, each converter controller of the system 100 receives a number of "copies" of the digital output signals (i.e., of the encoder pulses A, B, Z) equal to the number of resolvers included in the system 100.

In block 934, the converter controller 150 determines a control strategy for controlling the associated power converter 130 based on the encoder pulses produced by the local RDC 152 and any encoder pulses received from the other priority controllers via the communication bus 192. To do so, the converter controller 150 may utilize any suitable strategy, technique, or algorithm to determine the control strategy. For example, the converter controller 150 may select which set of encoder pulses to use based on characteristics of each set (e.g., a signal-to-noise ratio of each set, the number of identified errors in each set, timing related to each set, etc.). As such, the converter controller 150 may determine to utilize the encoder pulses produced by its own local RDC 152 or the encoder pulses received from another priority controller. In other embodiments, the converter controller 150 may determine the control strategy based on all sets of encoder pulses. For example, the converter controller 150 may be configured to determine an average signal for each encoder pulse A, B, Z and use the averaged signals to control the power converter 130.

Subsequently, in block 936, the converter controller 150 controls the operation of the power converter 130 using the determined control strategy. For example, the converter controller 150 may control the power converter 130 based on the encoder pulses produced by the local RDC 152 based on the analog output signals received from the resolver 180 in block 938. Alternatively, in block 940, the converter controller 150 may control operation of the power converter 130 based on the encoder pulses received from another priority converter controller via the communication bus 192. Further, in block 942, the converter controller 150 may control the power converter 130 based on a combination (e.g., an average) of the encoder pulses produced by the RDC 152 and the encoder pulses received from other priority converter controllers.

After the converter controller 150 has initiated or continued control of the power converter 130 in block 936, the method 900 loops back to block 916 of FIG. 9A. In block 916, as discussed above, the converter controller 150 determines whether any error has been detected in the operation of the RDC 152. For example, the converter controller 150 may determine that the RDC 152 is no operating at all, is producing erroneous digital output signals (e.g., signals outside a reference threshold), or is otherwise inoperable. If so, the method 900 advances to block 944 in which the converter controller 150 deactivates the RDC 152 (or confirms it is in a deactivated state if the RDC 152 is not presently activated). Subsequently, in block 946, the converter controller 150 transmits a notification to other converter controllers of the control sub-system 120 (e.g., converter controller 160) that the RDC 152 has been deactivated. To do so, the converter controller 150 may broadcast that notification via the communication bus 190 (or via a direct message to each converter controller of the control sub-system 120 via the communication bus 190).

Referring back to block 912, if the converter controller 150 determines it does not have priority, or after the converter controller 150 has transmitted the notification that the RDC 152 has been deactivated in block 946, the method 900 advances to block 948. In block 948, the converter controller 150 sets the transceiver 156 to "receive" mode. The method 900 then advances to block 950 of FIG. 9C in which the converter controller 150 awaits a notification of activation of an RDC from another converter controller of the control sub-system 120. In block 952, the converter controller 150 determines whether an RDC activation notification has been received from another converter controller of the control sub-system 120. If not, the method 900 advances to block 954 in which the converter controller 150 determines whether an RDC activation error has been detected. For example, in some embodiments, if the converter controller 150 determines that it does not have the priority for the control sub-system 120 and has not received an RDC activation notification from another converter controller of the control sub-system 120 within a reference time period, the converter controller 150 may be configured to determine that an RDC activation has occurred. If no RDC activation error has been detected in block 954 (e.g., the notification time period has not yet expired), the method 900 loops back to block 950 in which the converter controller 150 continues to await receipt of an RDC activation notification from another converter controller (i.e., the priority converter controller) of the control sub-system 120 via the communication bus 190.

Referring back to block 952, if the converter controller 150 determines that an RDC activation notification has been received, the method 900 advances to block 956. In block 956, the converter controller 150 receives the digital output signals indicative of the shaft information (e.g., the angle and speed) of the motor shaft 114 from another converter controller of the control sub-system 120. That is, the transceiver 156 (set to "receive" mode) of the communication circuit 154 receives the encoder pulses A, B, Z from the present priority converter controller via the first communication bus 190. Additionally, in block 958, the converter controller receives the shaft information from the priority converter controller of the other control sub-systems of the system 100. For example, the receiver 158 receives the encoder pulses A, B, Z from the present priority converter controller of the control sub-system 122 via the second communication bus 192.

Subsequently, similar to block 934, the converter controller 150 determines a control strategy for controlling the associated power converter 130 based on the encoder pulses received from the priority controller of the local control sub-system 120 (e.g., from converter controller 160) via the first communication bus 190 or any encoder pulses received from the other priority controllers via the communication bus 192 in block 960. Again, the converter controller 150 may utilize any suitable strategy, technique, or algorithm to determine the control strategy. For example, the converter controller 150 may select which set of encoder pulses to use based on characteristics of each set (e.g., a signal-to-noise ratio of each set, the number of identified errors in each set, timing related to each set, etc.).

In block 962, the converter controller 150 controls the operation of the power converter 130 using the determined control strategy. For example, in block 964, the converter controller 150 may control the power converter 130 based on the encoder pulses received from a priority converter controller of its own control sub-system 120 via the first communication bus 190. Alternatively, in block 966, the converter controller 150 may control operation of the power converter 130 based on the encoder pulses received from a priority converter controller of a different control sub-system of the system 100 via the second communication bus 192. Further, in block 968, the converter controller 150 may control the power converter 130 based on a combination (e.g., an average) of the encoder pulses received from the priority converter controllers via the communication busses 190, 192.

After the converter controller 150 has initiated or continued control of the power converter 130 in block 962, the method 900 advances to block 970 in which the converter controller 150 determines whether an RDC inactive notification has been received from the present priority converter controller of the control sub-system 120. For example, as discussed above in regard to block 944, if the present priority converter controller of the control sub-system 120 determines that an error has occurred with its local RDC, the present priority converter controller may deactivate its RDC and broadcast a deactivation notification. In such situations, the transceiver 156 (operating in "receive" mode) of the converter controller 150 may receive the RDC deactivation notification via the first communication bus 190. If no RDC deactivation notification is received by the converter controller 150 in block 970, the method 900 loops back to block 956 in which the converter controller 150 continues to receive encoder pulses from the priority converter controller of its control sub-system 120 and the priority converter controller of other control sub-systems of the system 100.

If, however, the converter controller 150 does receive an RDC deactivation notification in block 970 or if the converter controller 150 determines an RDC activation error has been detected in block 954, the method 900 advances to block 972. In block 972, the converter controller 150 determines a new controller priority, relative to the other converter controllers of the control sub-system 120, while ignoring the present priority converter controller of the control sub-system 120. In this way, a converter controller 150 initially designated as the priority converter controller (e.g., via hardcoded priority) but experiencing operational errors (e.g., a failing RDC) is not considered in further priority determinations between the remaining converter controllers of the control sub-system 120. If there are no remaining converter controllers of the control sub-system 120 capable of being the priority converter controller, the converter controller 150 may generate an error notification in block 974. Such error notification may be embodied as any type of notification capable of providing notice to an operator of the system 100 including, but not limited to, an audible, visual, or tactile notification.

Regardless, after the converter controllers have determined the new priority converter controller in block 972, the method 900 loops back to 912 of FIG. 9A in which the converter controller 150 determines whether it has the priority as discussed above. In this way, the converter controller of the system 100 are capable of determining priority amongst themselves, sharing determined shaft information, and controlling the power converters of the system 100 based on the redundant shaft information.

Figure 10:
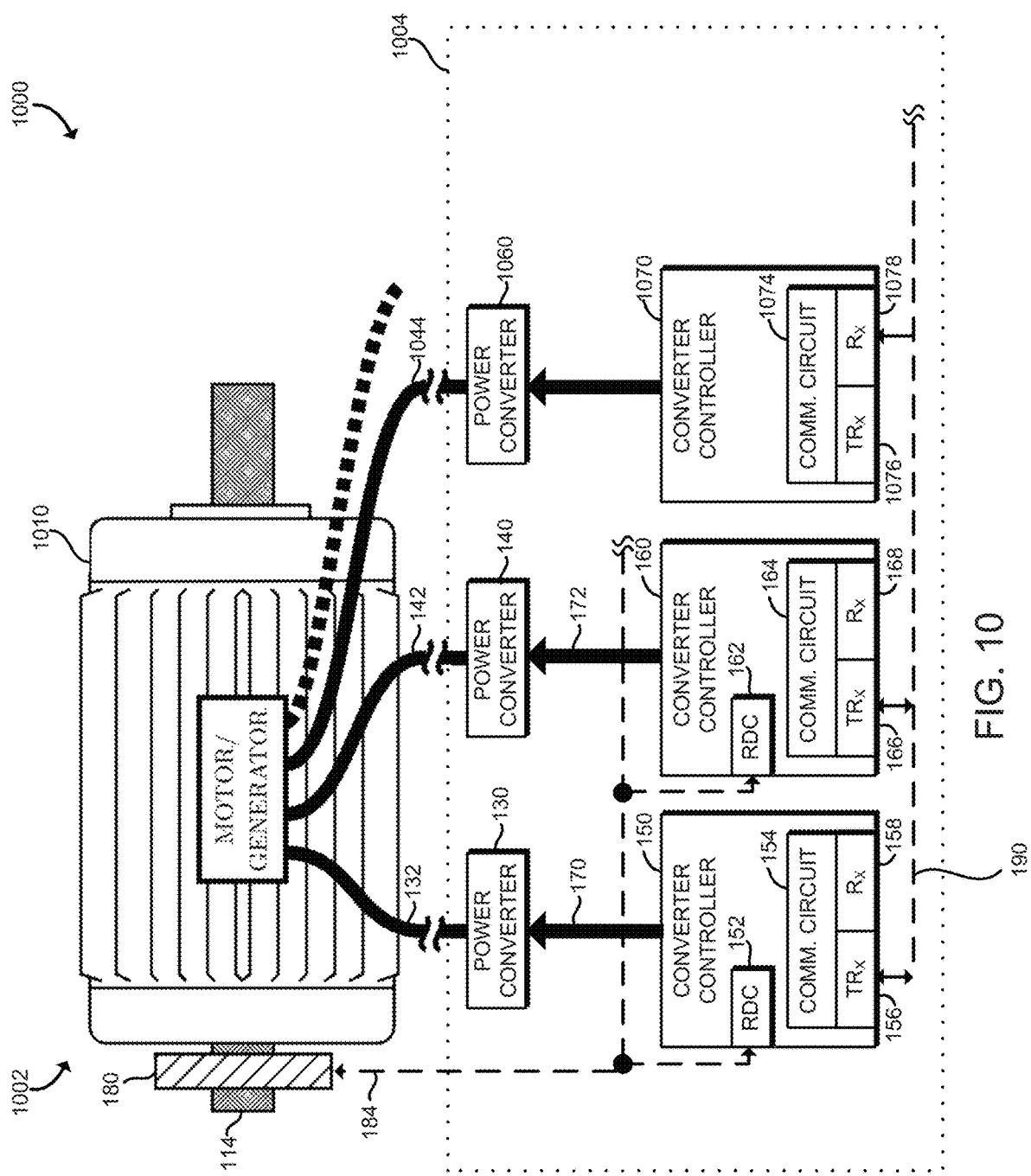
FIG. 10 is a simplified diagram of at least one embodiment of a multi-phase drive system including a multi-phase electric machine having multiple sets of windings, a resolver, and a group of converter controllers, at least some of which are coupled to the resolver and configured to share shaft information via a corresponding communication bus.
Figure 11:
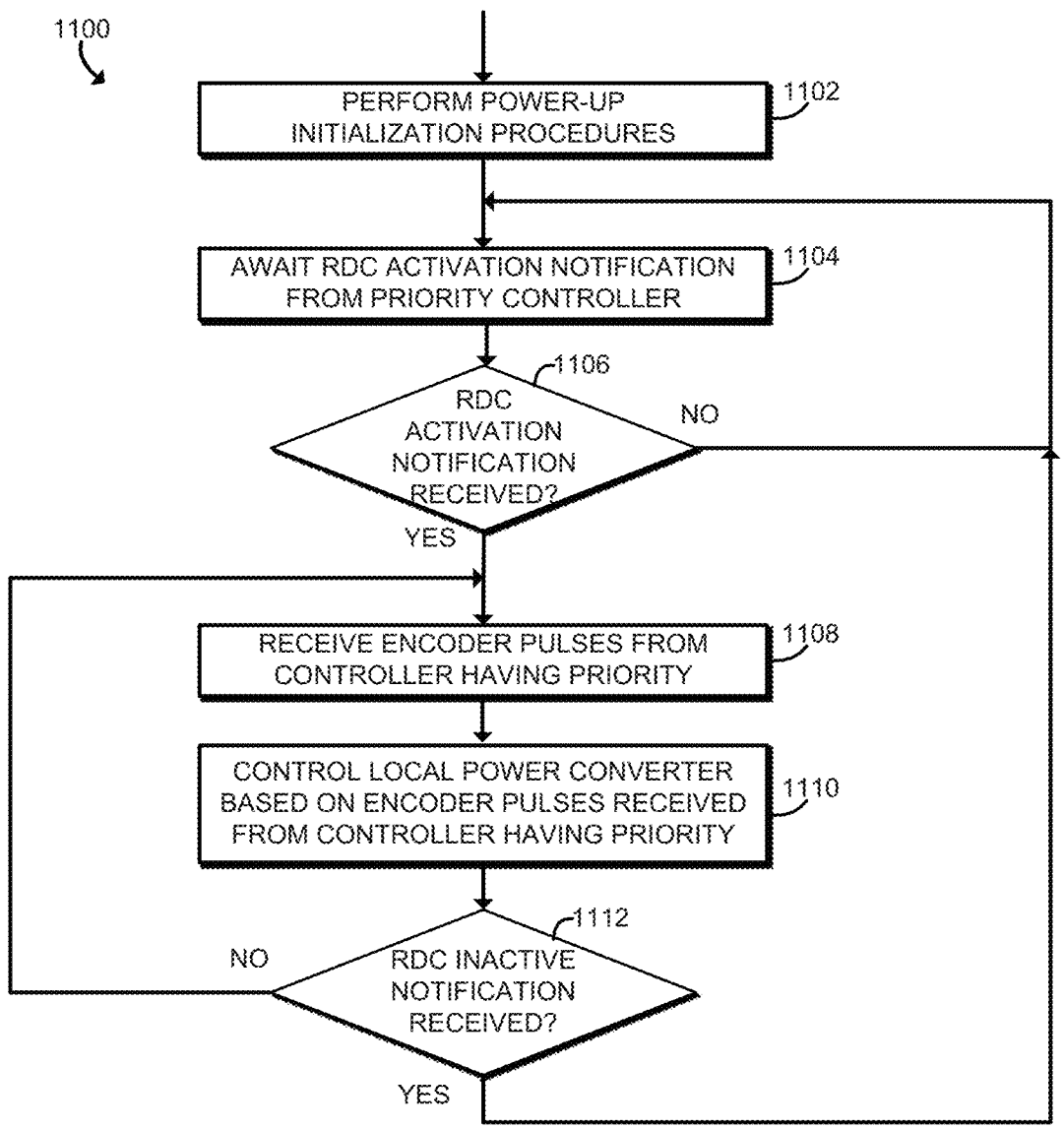
FIG. 11 is a simplified flow diagram of at least one embodiment of a method for controlling operation of a converter controller that is dependent on shaft information shared by other converter controllers over the corresponding communication bus of the system of FIG. 10.

Referring now to FIGS. 10 and 11, in another illustrative embodiment, a system 1000 for controlling operation of electric machines may include a multi-phase machine drive system 1002 and a multi-phase machine control system 1004. The multi-phase machine drive system 1002 illustrative includes multi-phase electric machine 1010, which includes or is otherwise coupled to the motor shaft 114. The multi-phase electric machine 1010 is illustratively embodied as an electric motor/generator having three or more sets of three-phase, five-phase, other multi-phase windings. The number of sets of windings of the multi-phase electric machine 1010 may be dependent upon the required torque and/or speed of the electric machine 1010.

Because the illustrative system 1000 includes only a single electric machine 1010, the system 1000 includes a single multi-phase machine control system 1004. The illustrative control system 1004 includes the converter controllers 150, 160, which include the RDCs 152, 162 communicatively coupled to the resolver 180 via the wire harness 184. Additionally, the control system 1004 includes a converter controller 1070 coupled to, and configured to control the operation of, a power converter 1060. The power converter 1060 has a structure and operation similar to the power converters 130, 140 discussed above and is coupled to a third winding set (not shown) of the multi-phase electric machine 1010 via an wire harness 1044, which is similar to the wire harnesses 132, 142 discussed above. The converter controller 1070 has a structure and components similar to the converter controllers 150, 160 described above, except that the converter controller 1070 does not have an RDC and, as such, is not coupled to the resolver 180 via the wire harness 184. Additionally, the communication circuit 1074 of the converter controller 1070 includes a transceiver 1076 and a receiver 1078. The receiver 1078 of the communication circuit 1074 is communicatively coupled to the communication bus 190, rather than transceiver 1076. As such, in some embodiments, the converter controller 1070 may not include the transceiver 1076.

It should be appreciated that because the converter controller 1070 does not include its own RDC, the converter controller 1070 relies on the shaft information transmitted by the converter controller 150, 160 (i.e., whichever one has priority) via the communication bus 190. In this way, the converter controller 1070 acts as a secondary converter controller, relative to the primary converter controller 150, 160. It should be appreciated that the reduced complexity of the converter controller 1070 allows for the addition of additional secondary converter controllers, similar to converter controller 1070, to the system 1000 for controlling additional winding sets at a reduced cost relative to the converter controllers 150, 160. Of course, in other embodiments, additional redundancy of the shaft information can also be added to the system 1000 by the inclusion of additional primary converter controllers including redundant RDCs, similar to converter controllers 150, 160. As such, in other embodiments, the system 1000 may include additional primary controllers (similar converter controllers 150, 160) and/or additional secondary controllers (similar converter controller 1070) depending on the number of additional sets of windings of the multi-phase electric motor 1010.

In operation, each of the converter controllers 150, 160 is configured to execute the method 900 discussed above in regard to FIGS. 9A-9C. However, the converter controller 1070 may execute a method 1100 for controlling operation of the power converter 1060 based on shaft information shared by other converter controllers of the control system 1004. The method 1100 begins with block 1102 in which the converter controller 1070 performs various power-up initialization procedures. Subsequently, in block 1104, the converter controller 1070 awaits a notification of activation of an RDC from a priority converter controller of the control system 1004. That is, because the converter controller 1070 does not include its own RDC, the converter controller 1070 relies on the shaft information transmitted by one of the primary converter controllers (i.e., a converter controller of the control system 1004 including an RDC) that has priority.

In block 1106, the converter controller 1070 determines whether an RDC activation notification has been received from a primary converter controller of the control system 1004. If not, the method 1100 loops back to block 1104 in which the converter controller 1070 continues to await receipt of an RDC activation notification via the communication bus 190. If, however, the converter controller 1070 has received an RDC activation notification, the method 900 advances to block 1108. In block 1108, the converter controller 1070 receives the digital output signals indicative of the shaft information (e.g., the angle and speed) of the motor shaft 114 from the primary converter controller of the control system 1004 presently having priority. That is, the receiver 1078 of the communication circuit 1074 receives the encoder pulses A, B, Z from the present priority primary converter controller (e.g., from the converter controller 150 or 160) via the communication bus 190. Subsequently, in block 1110, the converter controller 1070 controls the operation of the power converter 1060 based on the encoder pulses received from the primary converter controller of the control system 1004 presently having priority.

In block 1112, the converter controller 1070 determines whether an RDC inactive notification has been received from the priority primary converter controller via the communication bus 190. If not, the method 1100 loops back to block 1108 in which the converter controller 1070 continues to receive the encoder pulses from the present priority primary converter controller. However, if an RDC inactive notification has been received, the method 1100 loops back to block 1104 in which the converter controller 1070 awaits for receipt of another RDC activation notification (i.e., an RDC activation notification from a new priority converter controller of the system 1004).

Figure 12:
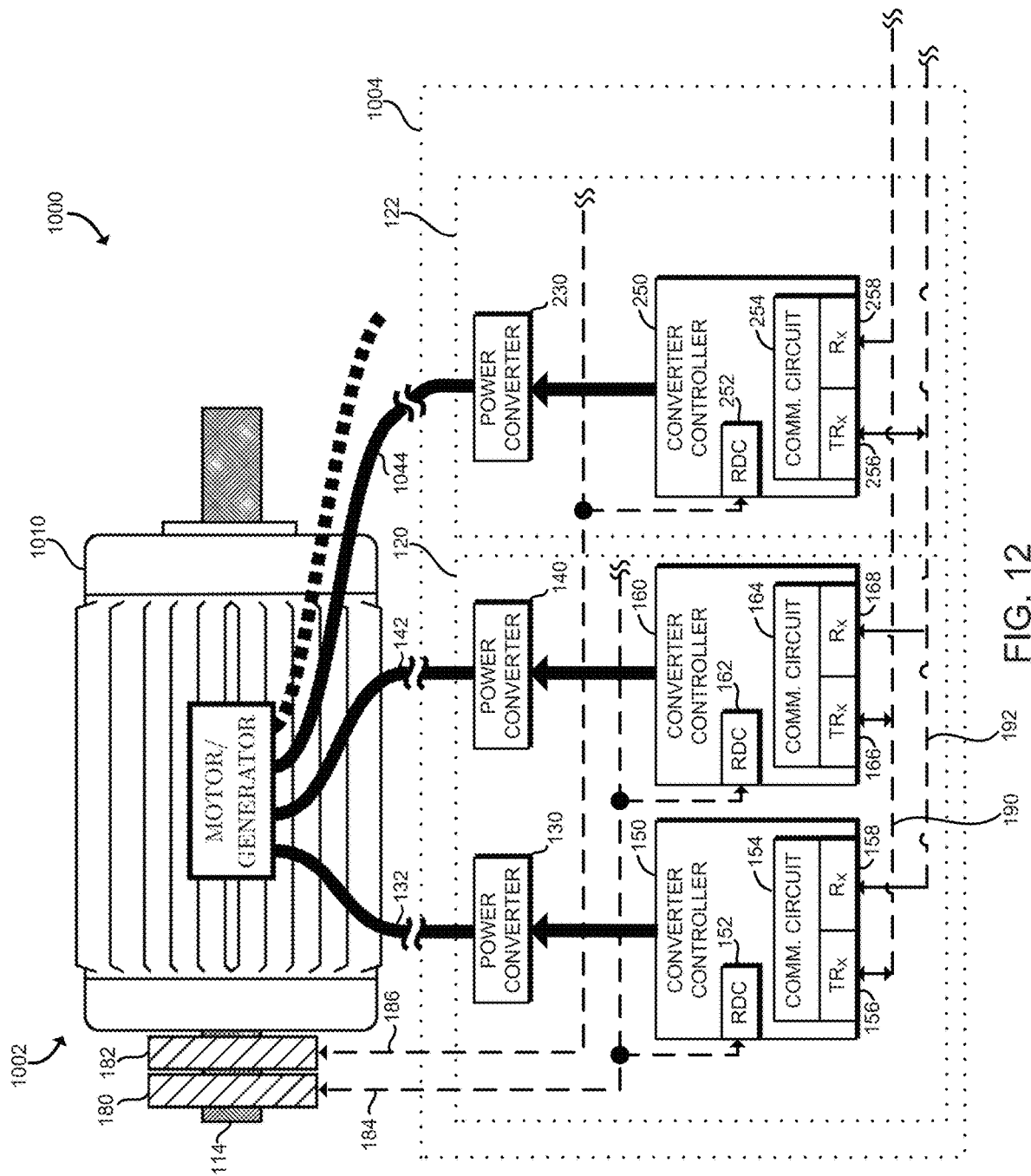
FIG. 12 is a simplified diagram of at least one embodiment of a multi-phase drive system including a multi-phase electric machine having multiple sets of windings, redundant resolvers, and a group of converter controllers coupled to each resolver and configured to share shaft information via a corresponding communication bus.

Referring now to FIG. 12, alternatively, the system 1000 may include multiple resolvers 180, 182 in some embodiments to add additional redundancy. In such embodiments, the control system 1004 includes multiple control sub-systems, such as control sub-system 120, 122. Each of the control sub-systems 120, 122 may include one, two, or more primary converter controllers having internal RDCs. For example, as shown in FIG. 12, the control sub-system 120 includes the primary converter controllers 150, 160, and the control sub-system 122 includes the primary converter controller 250. Each of the primary converter controllers (e.g., converter controllers 150, 160, 250) may execute the method 900 discussed above to control its associated power converter 130, 140, 230. Of course, it should be appreciated that the control system 1004 may include additional control sub-systems, and each control sub-system of the control system 1004 may include one or more primary converter controllers (each having an internal RDC), in other embodiments based on the number of sets of windings of the multi-phase electric machine 1010 and the number of included resolvers in the system 1000. The inclusion of additional resolvers and primary converter controllers increases the redundancy of the shaft information. Additionally, the system 1000 may include secondary converter controllers that do not include an internal RDC, similar to secondary converter controller of 1070, in other embodiments to reduce complexity and costs in those situations in which further redundancy is not needed.

Figure 13:
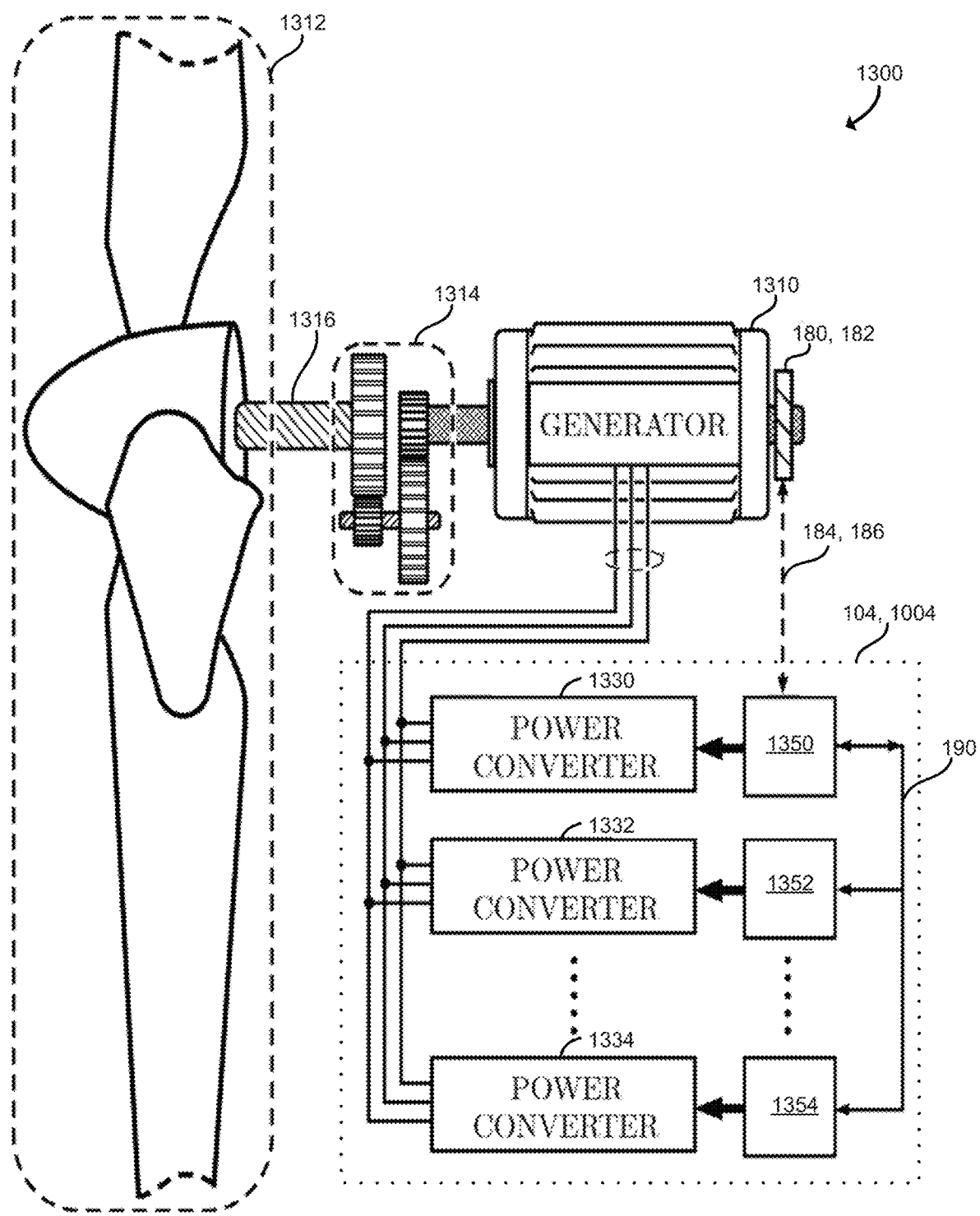
FIG. 13 is a simplified diagram of at least one embodiment of a wind turbine generator system including a multi-phase generator, a resolver, and a group of converter controllers configured to share shaft information via a corresponding communication bus.

It should be appreciated that the various technologies described herein are applicable to other applications as well, including aerospace, hybrid electric vehicles, rail traction systems, wind power generation (WPG) systems, modular multi-level converter (MMC) drive systems, or other application in which a multi-machine or multi-phase machine drive is utilized accompanied with constraints of weight, space and redundancy. For example, as shown in FIG. 13, the control system 104, 1004 may be incorporated into a wind power generation system 1300 in some embodiments. The WPG system 1300 illustrative includes a high-power, three-phase generator 1310, and the converter control system 104 includes converter controllers 1350, 1352, and 1354, each of which may be similar to the converter controllers 150, 160, 250, 260 or 1070 described above. Each converter controller 1350, 1352, and 1354 is communicatively coupled to, and controls the operation of, the generator 1310. As shown in FIG. 13, the WPG system 1300 also includes a rotating wind turbine 1312 connected to a gear box 1314 via a shaft 1316. It should be appreciated that in megawatt-scale generators, multiple paralleled power converters are often required to support the generated power rating. Redundancy of the shaft information and, as such, increased reliability is obtain using the technologies discussed herein, which are considerations in many applications including off-shore applications. Additionally, some configurations of the WPG system 1300 have the generator 1310 and the converter control system 104 located apart from each other (e.g., the generator 1310 may be located in the nacelle while the converter control system is located on the ground). However, such "long distance" communication is supported by the use of the RS-485 communication bus 190, 192.

Figure 14:
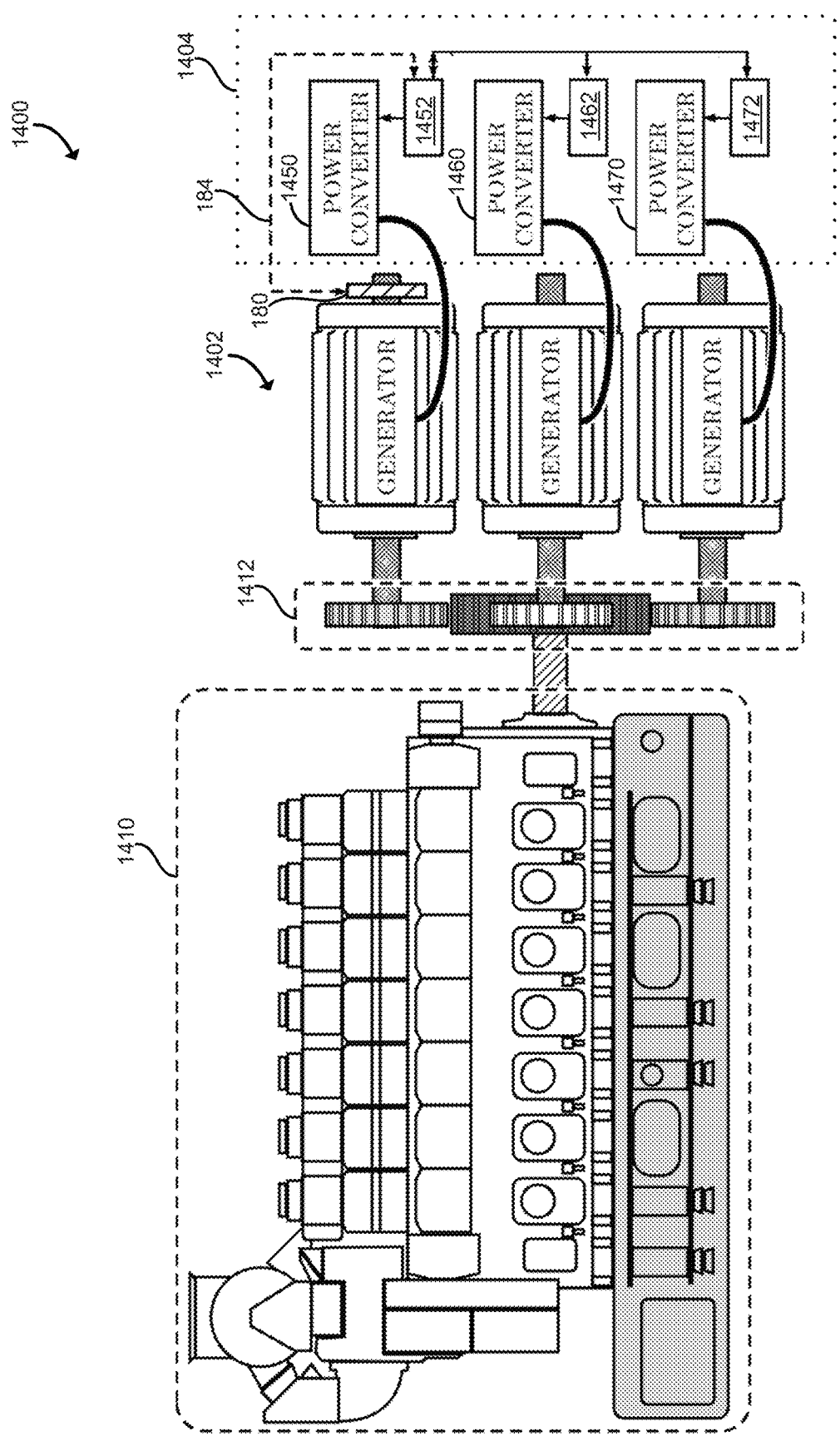
FIG. 14 is a simplified diagram of at least one embodiment of a multi-rotor generator system including multi-generators, a resolver, and a group of converter controllers configured to share shaft information via a corresponding communication bus.

Additionally, as shown in FIG. 14, the disclosed technologies may also be included in a transfer case multi-rotor system 1400, which may be used in some rail and/or traction applications in which a single shaft provides rotational power to multiple rotors. The multi-rotor system 1400 includes a prime mover engine 1410, which provides rotation power to each generator of a multi-generator system 1402 via a transfer case 1412. The multi-rotor system 1400 includes a control system 1404 including a group of a power converter 1450, 1460, 1470 and an associated converter controller 1452, 1462, 1472, respectively, for each generator of the multi-generator control system. Illustratively, the converter controller 1452 is electrically coupled to the resolver 180 via the wire harness 184. Additionally, the converter controller 1452 is communicatively coupled to each of the other converter controllers 1462 and 1472 via the communication bus 190 and is configured to transmit the encoder pulses to the other converter controllers 1462 and 1472 as discussed above. In such embodiments and to reduce costs, each of the power converters 1460, 1470 may be embodied as the converter controller 1070 discussed above in regard to FIG. 10. Alternatively, each of the converter controllers 1452, 1462, and 1472 may include its own RDC communicatively coupled to the resolver 180 via the wire harness 184 similar to control sub-system 120 discussed above in regard to FIG. 1. In this way, the converter controllers of the control system 1404 are capable of sharing the encoder pulses determined from a single resolver coupled to a motor shaft of a single generator of the multi-generator system 1402.

Figure 15:
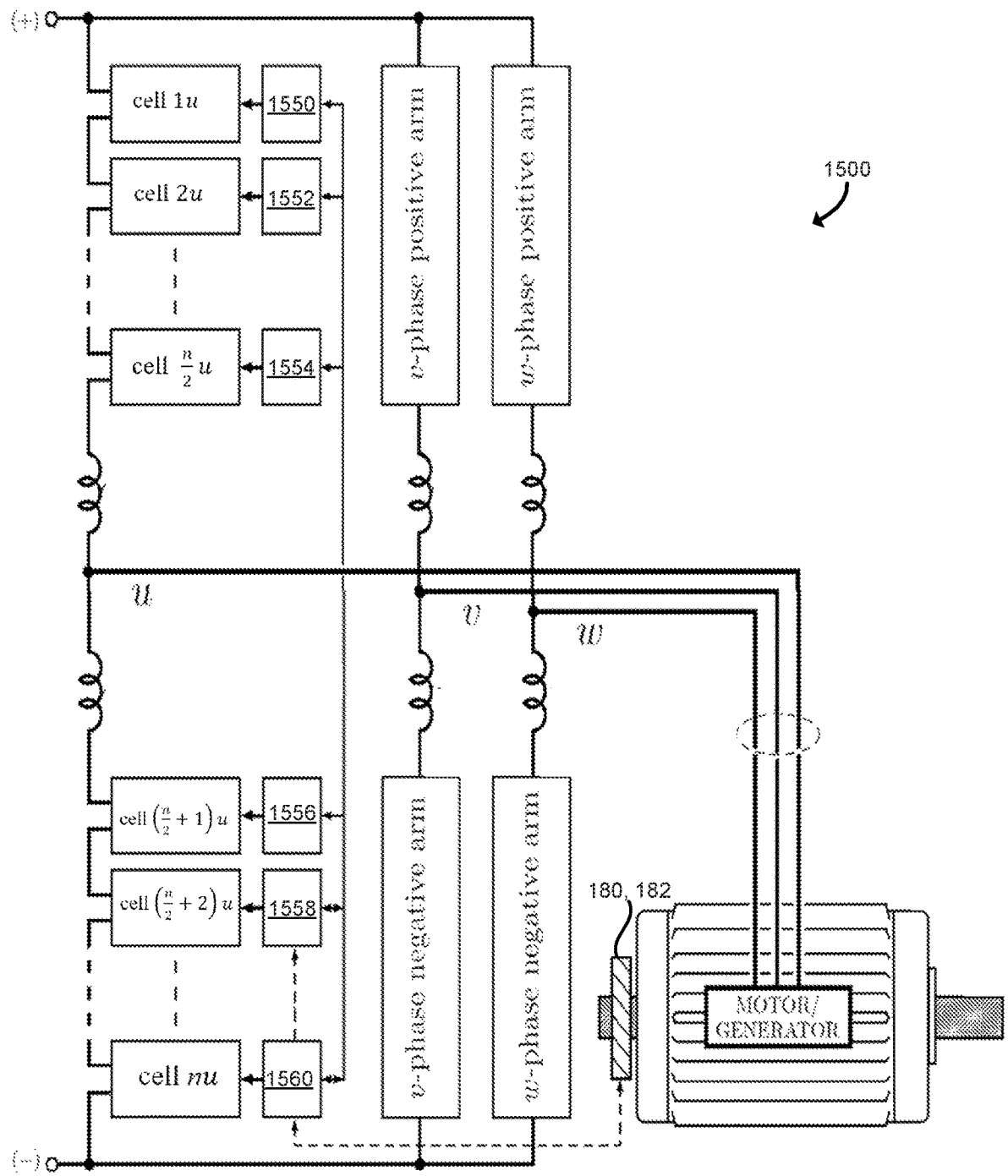
FIG. 15 is a is a simplified diagram of at least one embodiment of an electrical drive system including a multi-phase electric machine, a resolver, and a modular, multi-level converter with distributed controllers configured to share shaft information via a corresponding communication bus.

Furthermore, as shown in FIG. 15, the disclosed technologies may also be included in a modular multi-level converter (MMC) drive system 1500. As shown in FIG. 15, each phase leg of the system 1500 includes a positive and a negative arm connected in series between positive and negative terminal through associated power inductors. The illustrative MMC drive system 1500 generates multi-level voltage waveforms at the middle points between the power inductors. Additionally, in each arm, a number of individual half-bridge cells are connected in series, each of which may include a controller 1550, 1552, 1554, 1556, 1558, 1560. Each of the controllers 1550, 1552, 1554, 1556, 1558, 1560 may be embodied as and operate in a manner similar to the converter controllers 150, 160, 250, 260, 1070 discussed above. As such, the controller 1550, 1552, 1554, 1556, 1558, 1560 require shaft information, which may be generated and shared by the present priority controller based on the analog output signals received from the resolver 180, 182 as discussed in detail above.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A system for controlling operation of a plurality of power converters, the system comprising:
    a resolver coupled to a shaft of a multi-phase electric machine of a motor drive system;
    a first power converter electrically coupled to a first set of windings of the multi-phase electric machine;
    a second power converter electrically coupled to a second set of windings of the multi-phase electric machine;
    a third power converter electrically coupled to a third set of windings of the multi-phase electric machine;
    a first converter controller communicatively coupled to the first power converter and having (i) a first resolver-to-digital converter (RDC) communicatively coupled to the resolver to receive analog output signals from the resolver and (ii) a communication circuit, wherein the first RDC, while activated, is configured to convert the analog output signals to first digital output signals indicative of an angle and a speed of the shaft;
    a second converter controller communicatively coupled to the second power converter and having (i) a second RDC communicatively coupled to the resolver to receive the analog output signals from the resolver and (ii) a communication circuit, wherein the second RDC is configured to convert, while activated, the analog output signals to second digital output signals indicative of an angle and a speed of the shaft;
    a third converter controller communicatively coupled to the third power converter and having a communication circuit; and
    a communication bus, wherein the communication circuit of each of the first, second, and third converter controllers is coupled to the communication bus,
    wherein the third converter controller is configured to (i) receive, via the communication bus, the first digital output signals from the first converter controller while the first RDC is activated and the second digital output signals from the second converter controller while the second RDC is activated and (ii) control operation of the third power converter based on the received first or second digital output signals.

2. The system of claim 1, wherein the communication circuit of the first converter controller includes a first transceiver communicatively coupled to the communication bus, the second converter controller includes a second transceiver communicatively coupled to the communication bus, and the third converter controller includes a receiver coupled to the communication bus.

3. The system of claim 1, wherein the first converter controller is configured to:
    determine whether a priority of the first converter controller is greater than a priority of the second converter controller;
    activate the first RDC in response to a determination that the priority of the first converter controller is greater than the priority of the second converter controller; and
    transmit, in response to activation of the first RDC, the first digital output signals to the second converter controller and the third converter controller over the communication bus.

4. The system of claim 3, wherein the communication circuit of the first converter controller includes a transceiver communicatively coupled to the communication bus, and
    wherein to transmit the first digital comprises to set the transceiver to transmit.

5. The system of claim 4, wherein the communication circuit of the second converter controller includes a transceiver communicatively coupled to the communication bus and set to receive,
    the first converter controller is further configured to transmit in response to activation of the first RDC and prior to transmission of the first digital output signals, a notification to the second converter controller and the third converter controller over the communication bus, wherein the notification indicates that the first RDC has been activated.

6. The system of claim 3, wherein to determine whether a priority of the first converter controller is greater than a priority of the second converter controller comprises to look up the priority of the first converter controller and the second converter controller in a look-up table stored by the first converter controller.

7. The system of claim 3, wherein to determine whether a priority of the first converter controller is greater than a priority of the second converter controller comprises to (i) broadcast the priority of the first converter controller over the communication bus, (ii) receive the priority of the second converter controller over the communication bus and from the second converter controller, and (iii) compare the priority of the first converter controller to the priority of the second converter.

8. The system of claim 3, wherein the first converter controller is further configured to transmit, in response to activation of the first RDC and prior to transmission of the first digital output signals, a notification to the second converter controller and the third converter controller over the communication bus, wherein the notification indicates that the first RDC has been activated.

9. The system of claim 1, wherein the third converter controller is configured to receive a notification from the first converter controller that the first RDC has been activated, receive the first digital output signals subsequently to receipt of the notification, and control operation of the third power converter based on the received first digital output signals.

10. The system of claim 9, wherein the third converter controller is configured to halt operation of the third power converter in response to receiving a subsequent notification from the first converter controller that the first RDC has been deactivated.

11. A method for controlling operation of a power converter, the method comprising:
    determining, by a first converter controller, whether a notification from a second converter controller has been received over a communication bus coupled to the first converter controller and the second converter controller, wherein the notification indicates that a resolver-to-digital converter (RDC) of the second converter controller has been activated and wherein the RDC of the second converter controller is communicatively coupled to a resolver coupled to a shaft of a multi-phase electric machine of a motor drive system;
    receiving, by the first converter controller over the communication bus and subsequent to receiving the notification, digital output signals from the second converter controller, wherein the digital output signals are indicative of an angle and a speed of the shaft; and
    controlling, by the first converter controller and in response to receiving the digital output signals, a power converter coupled to a set of windings of the multi-phase electric machine based on the received digital output signals.

12. The method of claim 11, wherein receiving the digital output signals comprises receiving, by a receiver of the first converter controller coupled to the communication bus, digital output signals transmitted by a transceiver of the second converter controller coupled to the communication bus.

13. The method of claim 11, further comprising:
    receiving, by the first converter controller over the communication bus and from the second converter controller, a notification that the RDC of the second converter controller has been deactivated; and
    halting, by the first converter controller, operation of the power converter in response to receiving the notification that the RDC of the second converter controller has been deactivated.

14. The method of claim 13, further comprising:
    determining, by the first converter controller and subsequent to halting operation of the power converter, whether another notification from a third converter controller has been received over the communication bus, wherein the another notification indicates that an RDC of the third converter controller has been activated and wherein the RDC of the third converter controller is communicatively coupled to the resolver;
    receiving, by the first converter controller over the communication bus and subsequent to receiving the another notification, digital output signals from the third converter controller, wherein the digital output signals from the third converter controller are indicative of an angle and a speed of the shaft; and
    controlling, by the first converter controller and in response to receiving the digital output signals from the third converter controller, the power converter based on the digital output signals received from the third converter controller.

15. A method for controlling operation of a plurality of power converters, the method comprising:
    receiving, by a first resolver-to-digital converter (RDC) of a first converter controller, analog output signals from a resolver coupled to a shaft of a multi-phase electric machine;
    converting, by the first RDC, the analog output signals to first digital output signals indicative of an angle and a speed of the shaft;
    controlling, by the first converter controller and based on the first digital output signals, operation of a first power converter coupled to a first set of windings of the multi-phase electric machine;
    transmitting, by a transceiver of a communication circuit of the first converter controller and over a communication bus, the first digital output signals to a second converter controller and a third converter controller, wherein the transceiver of the communication circuit of the first converter controller is set to transmit;
    receiving, by a transceiver of a communication circuit of the second converter controller communicatively coupled to the communication bus, the first digital output signals, wherein the transceiver of the communication circuit of the second converter controller is set to receive;
    controlling, by the second converter controller and based on the first digital output signals, operation of a second power converter coupled to a second set of windings of the multi-phase electric machine;
    receiving, by a receiver of a communication circuit of the third converter controller communicatively coupled to the communication bus, the first digital output signals; and
    controlling, by the third converter controller and based on the first digital output signals, operation of a third power converter coupled to a third set of windings of the multi-phase electric machine.

16. The method of claim 15, further comprising:
    activating, by the first converter controller and prior to receiving the analog output signals, the first RDC; and
    transmitting, by the transceiver of the first converter controller and over the communication bus, an activation notification to the second converter controller and the third converter controller, wherein the activation notification indicates that the first RDC has been activated.

17. The method of claim 16, further comprising determining, by the first converter controller, whether a priority of the first converter controller is greater than a priority of the second converter,
    wherein activating the first RDC comprises activating the first RDC in response to a determination that the priority of the first converter controller is greater than the priority of the second converter.

18. The method of claim 16, further comprising:
    receiving, by the receiver of the third converter controller over the communication bus, the activation notification from the first converter controller,
    wherein controlling operation of the third power converter comprises controlling, by the third converter controller and in response to receiving the activation notification, the operation of the third power converter based on the first digital output signals.

19. The method of claim 18, further comprising:
    detecting, by the first converter controller, an error in operation of the first RDC;
    deactivating, by the first converter controller and in response to detecting the error, the first RDC;
    transmitting, by the transceiver of the first converter controller, a deactivation notification to the second converter controller and the third converter controller over the communication bus;

setting, by the first converter controller and subsequent to transmitting the deactivation notification, the transceiver of the first converter controller to receive; and halting, by the third converter controller and in response to receiving the deactivation notification, operation of the third power converter.

20. The method of claim 19, further comprising:

activating, by the second converter controller and in response to receiving the deactivation notification, a second RDC of the second converter controller;

setting, by the second converter controller and in response to activating the second RDC, the transceiver of the second converter controller to transmit;

transmitting, by the transceiver of the second converter controller and in response to activating the second RDC, another activation notification to the first converter controller and the third converter controller, wherein the another activation notification indicates that the second RDC has been activated;

receiving, by the second RDC and in response to activating the second RDC, analog output signals from the resolver coupled to the shaft of the multi-phase electric machine;

converting, by the second RDC, the analog output signals to second digital output signals indicative of an angle and a speed of the shaft;

controlling, by the second converter controller and based on the second digital output signals, operation of the second power converter;

transmitting, by the transceiver of the second converter controller and over the communication bus, the second digital output signals to the first converter controller and the third converter controller;

receiving, by the transceiver of the first converter controller, the second digital output signals;

controlling, by the first converter controller and based on the second digital output signals, operation of the second power converter;

receiving, by the receiver of the third converter controller, the second digital output signals; and controlling, by the third converter controller and based on the second digital output signals, operation of the third power converter.

\* \* \* \* \*